US012684557B2

(12) United States Patent
Singh et al.

(10) Patent No.: US 12,684,557 B2
(45) Date of Patent: Jul. 14, 2026

(54) COLLISION REDUCTION IN WIRELESS MEDIUM ACCESS

(71) Applicant: Virewirx, Inc., San Diego, CA (US)

(72) Inventors: Jaspreet Singh, Upland, CA (US);
Siddhartha Mallik, San Diego, CA
(US); Peter John Black, La Jolla, CA
(US); Tamer Adel Kadous, San Diego,
CA (US)

(73) Assignee: Virewirx, Inc., San Diego, CA (US)

( * ) Notice: Subject to any disclaimer, the term of this
patent is extended or adjusted under 35
U.S.C. 154(b) by 343 days.

(21) Appl. No.: 18/224,328

(22) Filed: Jul. 20, 2023

(65) Prior Publication Data

US 2024/0032019 A1 Jan. 25, 2024

Related U.S. Application Data

(60) Provisional application No. 63/392,071, filed on Jul.
25, 2022, provisional application No. 63/392,050,
filed on Jul. 25, 2022.

(51) Int. Cl.
H04W 72/1263 (2023.01)
H04W 72/52 (2023.01)
H04W 72/541 (2023.01)

(52) U.S. Cl.
CPC ....... H04W 72/1263 (2013.01); H04W 72/52
(2023.01); H04W 72/541 (2023.01)

(58) Field of Classification Search
CPC H04W 72/1263; H04W 72/541; H04W 72/52
See application file for complete search history.

(56) References Cited

U.S. PATENT DOCUMENTS 8,279,811 B2 * 10/2012 Love .................. H04L 27/2607
370/329
8,412,227 B2 4/2013 Edge
8,514,988 B2 8/2013 Wu
8,744,018 B2 6/2014 Chen
(Continued)

FOREIGN PATENT DOCUMENTS

KR 10-2011-0018450 2/2011

OTHER PUBLICATIONS

International Search Report and Written Opinion for Application
No. PCT/US2023/070613, mailed Nov. 6, 2023.

*Primary Examiner* — Chandrahas B Patel
(74) *Attorney, Agent, or Firm* — Knobbe, Martens, Olson
& Bear, LLP

(57) ABSTRACT

A process for reducing contentions and/or packet collisions
during downlink and/or uplink communications in a multi-
point environment that uses time slice scheduling to over-
come the technical deficiencies of CBAP and rasterized-
based scheduling is described herein. For example, an access
point (AP) controller configured to communicate with one or
more APs obtains interference data from one or more APs
and/or stations (STAs) and/or traffic load data, and uses this
information to divide a time period into one or more time
slices and to assign each AP to one or more of the time slices.
The AP controller uses this information to determine a
number of time slices in which to divide the time period and
a length of each time slice. Once the number and length of
the time slices is determined, the AP controller assigns one
or more APs to each time slice.

20 Claims, 11 Drawing Sheets

(56) References Cited

U.S. PATENT DOCUMENTS

| | | | |
|---|---|---|---|
| 8,839,079 | B2 | 9/2014 | Chen |
| 9,119,026 | B2 | 8/2015 | Black |
| 9,198,053 | B2 | 11/2015 | Edge |
| 10,178,649 | B2 | 1/2019 | Liu |
| 10,182,404 | B2 | 1/2019 | Prakash |
| 10,201,014 | B2 | 2/2019 | Kadous |
| 10,218,406 | B2 | 2/2019 | Liu |
| 10,219,235 | B2 | 2/2019 | Patel |
| 10,219,252 | B2 | 2/2019 | Chendamarai Kannan |
| 10,219,300 | B2 | 2/2019 | Gorokhov |
| 10,225,818 | B2 | 3/2019 | Liu |
| 12,402,120 | B2 * | 8/2025 | Thubert ............ H04W 72/1268 |
| 2009/0080386 | A1 | 3/2009 | Yavuz et al. |
| 2010/0226317 | A1 | 9/2010 | Horn et al. |
| 2012/0127870 | A1 | 5/2012 | Zhao |
| 2012/0127923 | A1 | 5/2012 | Zhao |
| 2014/0029705 | A1 | 1/2014 | Wu |
| 2014/0038645 | A1 | 2/2014 | Wu |
| 2014/0053049 | A1 | 2/2014 | Chen |
| 2018/0042018 | A1 | 2/2018 | Bhushan |
| 2018/0063799 | A1 | 3/2018 | Sadek |
| 2018/0098225 | A1 | 4/2018 | Damnjanovic |
| 2018/0103472 | A1 | 4/2018 | Zhang |
| 2018/0317093 | A1 | 11/2018 | Li |
| 2018/0343588 | A1 | 11/2018 | Sadek |
| 2018/0352563 | A1 | 12/2018 | Liu |
| 2018/0359656 | A1 | 12/2018 | Liu |
| 2018/0359685 | A1 | 12/2018 | Li |
| 2018/0367362 | A1 | 12/2018 | Sun |
| 2018/0368089 | A1 | 12/2018 | Yerramalli |
| 2018/0376392 | A1 | 12/2018 | Wu |
| 2018/0376393 | A1 | 12/2018 | Wu |
| 2018/0376503 | A1 | 12/2018 | Sun |
| 2019/0007946 | A1 | 1/2019 | Yerramalli |
| 2019/0014481 | A1 | 1/2019 | Yerramalli |
| 2019/0014507 | A1 | 1/2019 | Zhang |
| 2019/0014589 | A1 | 1/2019 | Yerramalli |
| 2019/0020424 | A1 | 1/2019 | Yerramalli |
| 2019/0020461 | A1 | 1/2019 | Yerramalli |
| 2019/0020522 | A1 | 1/2019 | Sun |
| 2019/0020527 | A1 | 1/2019 | Lei |
| 2019/0020528 | A1 | 1/2019 | Lei |
| 2019/0020529 | A1 | 1/2019 | Lei |
| 2019/0021080 | A1 | 1/2019 | Lei |
| 2019/0028999 | A1 | 1/2019 | Yerramalli |
| 2019/0029019 | A1 | 1/2019 | Zhang |
| 2019/0037376 | A1 | 1/2019 | Liu |
| 2019/0037427 | A1 | 1/2019 | Yerramalli |
| 2019/0037481 | A1 | 1/2019 | Zhang |
| 2019/0037482 | A1 | 1/2019 | Damnjanovic |
| 2019/0037525 | A1 | 1/2019 | Liu |
| 2019/0037603 | A1 | 1/2019 | Damnjanovic |
| 2019/0053269 | A1 | 2/2019 | Lei |
| 2019/0059001 | A1 | 2/2019 | Yerramalli |
| 2019/0059102 | A1 | 2/2019 | Yerramalli |
| 2019/0069325 | A1 | 2/2019 | Yerramalli |
| 2020/0022029 | A1 | 1/2020 | Sadek et al. |
| 2020/0059854 | A1 | 2/2020 | Li et al. |
| 2020/0100250 | A1 | 3/2020 | Zhang |
| 2021/0243639 | A1 | 8/2021 | Sanaullah |
| 2022/0006527 | A1 | 1/2022 | Wageningen |

* cited by examiner

Figure 2:
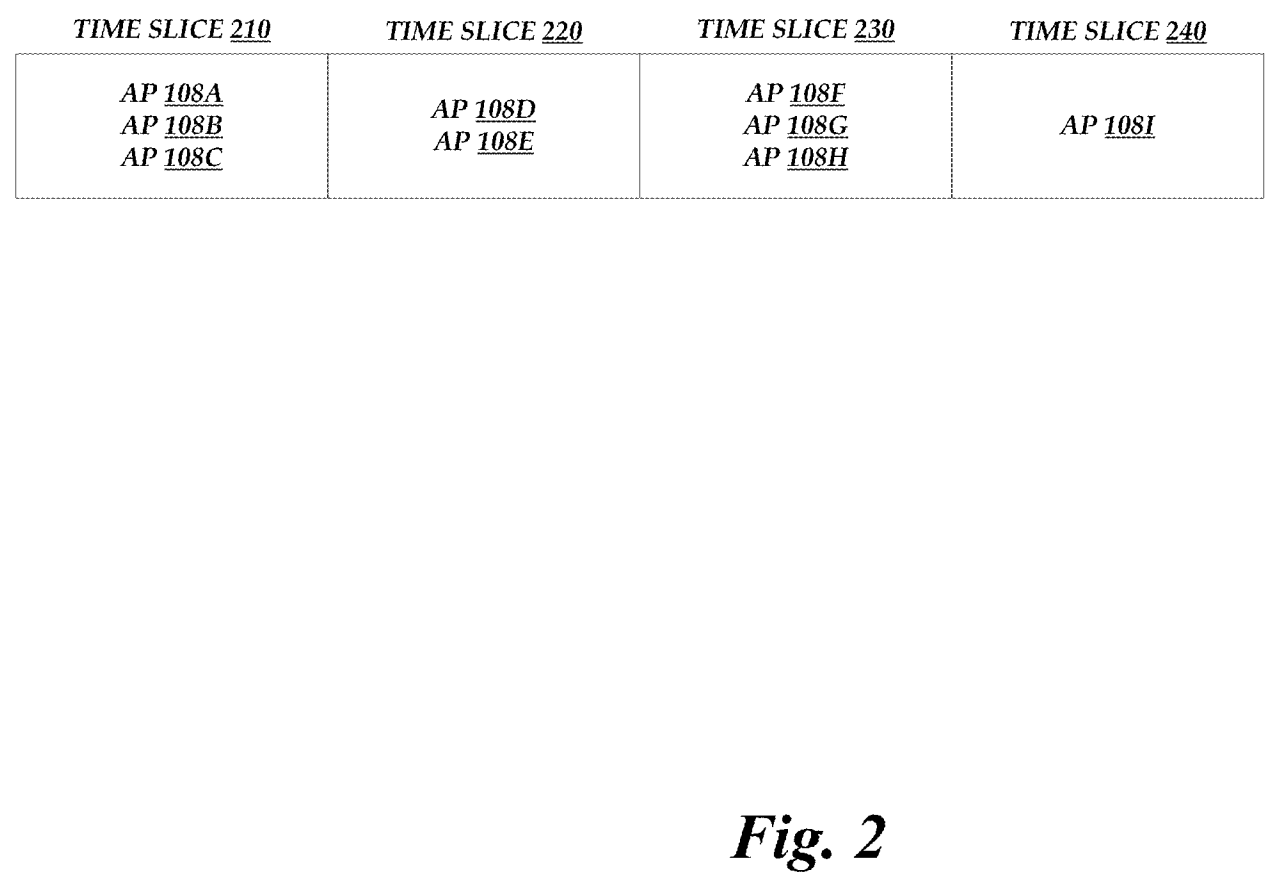

TIME SLICE 210

AP 108A
AP 108B
AP 108C

TIME SLICE 220

AP 108D
AP 108E

TIME SLICE 230

AP 108F
AP 108G
AP 108H

TIME SLICE 240

| TIME SLICE 410 | TIME SLICE 420 | TIME SLICE 430 | TIME SLICE 440 |
|---|---|---|---|
| AP 108A → STA 110A<br>AP 108E → STA 110C | AP 108B → STA 110B | AP 108E → STA 110D | AP 108F → STA 110E |

*Fig. 4*

| TIME SLICE 510 | TIME SLICE 520 | TIME SLICE 530 | TIME SLICE 540 |
|---|---|---|---|
| AP 108B<br>AP 108C | AP 108D<br>AP 108E | AP 108B<br>AP 108C<br>AP 108H | AP 108G |

OBTAIN INTERFERENCE DATA AND TRAFFIC LOAD DATA

704

DETERMINE A NUMBER OF TIME SLICES, A LENGTH OF THE TIME SLICES, AND AN ASSIGNMENT OF APs TO TIME SLICES

706

TRANSMIT, TO EACH AP, A SCHEDULING MESSAGE INDICATING AN ASSIGNED TIME SLICE

*800*

802

TRANSMIT BEAM PILOTS

804

OBTAIN INTERFERENCE DATA FROM ONE OR MORE STAs

806

TRANSMIT THE INTERFERENCE DATA TO AN AP CONTROLLER

808

RECEIVE A SCHEDULING MESSAGE INDICATING A TIME SLICE DURING WHICH THE AP CAN COMMUNICATE WITH A STA

COLLISION REDUCTION IN WIRELESS MEDIUM ACCESS

CROSS-REFERENCE TO RELATED APPLICATIONS

This application claims the benefit of priority to U.S. Patent Provisional Application No. 63/392,050, entitled "COLLISION REDUCTION IN WIRELESS MEDIUM ACCESS" and filed on Jul. 25, 2022, and to U.S. Patent Provisional Application No. 63/392,071, entitled "TIME SLICE-BASED DATA PACKET TRANSMISSION" and filed on Jul. 25, 2022, which are hereby incorporated by reference herein in their entireties. Any and all applications for which a foreign or domestic priority claim is identified in the Application Data Sheet as filed with the present application, are hereby incorporated by reference under 37 CFR 1.57.

BACKGROUND

Technical Field

Embodiments of this disclosure relate to wireless communication systems, such as multipoint wireless communication systems.

Description of Related Technology

The types of modern computing devices continues to increase along with the differing and dynamic needs of each device. The wireless communication systems providing services to such devices are facing increasing constraints on resources and demands for quality and quantities of service. Accordingly, improvements in providing wireless communication services are desired.

SUMMARY

One aspect of the disclosure provides a method of scheduling wireless communication based on time slices. The method further comprises obtaining interference data from one or more access points; obtaining traffic load data for one or more data packets to be transmitted by the one or more access points; determining a number of time slices within a downlink transmission period based on a number of the one or more access points; determining at least one of a length of the time slices or an assignment of the one or more access points to the time slices based on at least one of the interference data or the traffic load data; and transmitting, to each of the one or more access points, a scheduling message indicating a time slice within the time slices assigned to the respective access point.

The method of the preceding paragraph can include any sub-combination of the following features: where a first access point in the one or more access points is assigned to two or more of the time slices; where the scheduling message transmitted to a first access point in the one or more access points causes the first access point to transmit a first data packet in the one or more data packets to an assigned station during the time slice indicated in the scheduling message; where the scheduling message transmitted to a first access point in the one or more access points further indicates a start time of the time slice assigned to the first access point and one of a duration or an end time of the time slice assigned to the first access point; where the scheduling message transmitted to a first access point in the one or more access points further indicates a station to which the first access point is configured to transmit during the time slice assigned to the first access point; where the scheduling message transmitted to a first access point in the one or more access points further indicates at least one of a spatial beam or a modulation and coding size of the first access point that the first access point is configured to use to transmit to a station during the time slice assigned to the first access point; where the determination of the number of time slices within the downlink transmission period is one of a static determination or a dynamic determination; where one of the determination of the number of time slices within the downlink transmission period, the determination of the length of the time slices, the determination of the assignment of the one or more access points to the time slices, a determination of an assignment of a station to be served by one of the one or more access points, a calculation of a beam index, or a calculation of a modulation and coding size (MCS) is one of static or dynamic across the downlink transmission period and a second downlink transmission period; where the method further comprises determining a second number of second time slices within a second downlink transmission period that follows the downlink transmission period; where the method further comprises determining at least one of a second length of the second time slices or a second assignment of the one or more access points to the second time slices for the second downlink transmission period; where each time slice in the time slices has a same length; where one or more of the time slices in the time slices has a same length or a different length; where one or more of the time slices in the time slices has a different length; where a uniform number of access points in the one or more access points is assigned to each of the time slices; where a non-uniform number of access points in the one or more access points is assigned to each of the time slices; where a uniform number or a non-uniform number of access points in the one or more access points is assigned to each of the time slices; where a first time slice in the time slices is reserved for one or more outgoing access points in the one or more access points, and wherein a second time slice in the time slices is reserved for one or more incoming access points in the one or more access points; where a first access point in the one or more access points serves a first station and is one of an outgoing or incoming access point for a second station, and where a first time slice in the time slices is reserved for the first access point to serve the second station and not the first station; where a first access point in the one or more access points is one of an outgoing or incoming access point, and where a duration of time for which the first access point is regarded as an outgoing or incoming access point is based on an absolute time duration or a number of instances in which a scheduling algorithm of an access point controller is run; where a first access point in the one or more access points is a serving access point for a station, and wherein a second access point in the one or more access points is a backup serving access point for the station; where the first access point and the second access point are assigned to different time slices in the time slices; and where the downlink transmission period comprises one of a contention-based access period or a schedule period, and wherein the schedule period is rasterized.

Another aspect of the disclosure provides non-transitory, computer-readable storage comprising computer-executable instructions, wherein the computer-executable instructions, when executed by an access point controller, cause the access point controller to: obtain interference data from one or more access points; obtain traffic load data for one or more data packets to be transmitted by the one or more access points; determine a number of time slices within a downlink transmission period based on a number of the one or more access points; determine at least one of a length of the time slices or an assignment of the one or more access points to the time slices based on at least one of the interference data or the traffic load data; and transmit, to each of the one or more access points, a scheduling message indicating a time slice within the time slices assigned to the respective access point.

The non-transitory, computer-readable storage of the preceding paragraph can include any sub-combination of the following features: where a first access point in the one or more access points is assigned to two or more of the time slices; where the scheduling message transmitted to a first access point in the one or more access points causes the first access point to transmit a first data packet in the one or more data packets to an assigned station during the time slice indicated in the scheduling message; where the scheduling message transmitted to a first access point in the one or more access points further indicates a start time of the time slice assigned to the first access point and one of a duration or an end time of the time slice assigned to the first access point; where the scheduling message transmitted to a first access point in the one or more access points further indicates a station to which the first access point is configured to transmit during the time slice assigned to the first access point; where the scheduling message transmitted to a first access point in the one or more access points further indicates at least one of a spatial beam or a modulation and coding size of the first access point that the first access point is configured to use to transmit to a station during the time slice assigned to the first access point; where the determination of the number of time slices within the downlink transmission period is one of a static determination or a dynamic determination; where the computer-executable instructions, when executed, further cause the access point controller to determine a second number of second time slices within a second downlink transmission period that follows the downlink transmission period; where the computer-executable instructions, when executed, further cause the access point controller to determine at least one of a second length of the second time slices or a second assignment of the one or more access points to the second time slices for the second downlink transmission period; where each time slice in the time slices has a same length; where one or more of the time slices in the time slices has a different length; where a uniform number of access points in the one or more access points is assigned to each of the time slices; where a non-uniform number of access points in the one or more access points is assigned to each of the time slices; where a first time slice in the time slices is reserved for one or more outgoing access points in the one or more access points, and wherein a second time slice in the time slices is reserved for one or more incoming access points in the one or more access points; where a first access point in the one or more access points is a serving access point for a station, and wherein a second access point in the one or more access points is a backup serving access point for the station; where the first access point and the second access point are assigned to different time slices in the time slices; and where the downlink transmission period comprises one of a contention-based access period or a schedule period, and wherein the schedule period is rasterized Another aspect of the disclosure provides a network system for wireless communication. The network system comprises an access point. The network system further comprises an access point controller comprising at least one processor and storing instructions, wherein the instructions, when executed by the at least one processor, cause the access point to perform operations, the operations comprising: obtaining interference data from the access point and one or more other access points, obtaining traffic load data for one or more data packets to be transmitted by the access point and the one or more other access points, determining a number of time slices within a downlink transmission period based on a number of the access point and the one or more other access points, determining at least one of a length of the time slices or an assignment of the access point and one or more other access points to the time slices based on at least one of the interference data or the traffic load data, and transmitting, to each of the access point and the one or more other access points, a scheduling message indicating a time slice within the time slices assigned to the respective access point.

The network system of the preceding paragraph can include any sub-combination of the following features: where a first access point in the one or more access points is assigned to two or more of the time slices; where the scheduling message transmitted to a first access point in the one or more access points causes the first access point to transmit a first data packet in the one or more data packets to an assigned station during the time slice indicated in the scheduling message; where the scheduling message transmitted to a first access point in the one or more access points further indicates a start time of the time slice assigned to the first access point and one of a duration or an end time of the time slice assigned to the first access point; where the scheduling message transmitted to a first access point in the one or more access points further indicates a station to which the first access point is configured to transmit during the time slice assigned to the first access point; where the scheduling message transmitted to a first access point in the one or more access points further indicates at least one of a spatial beam or a modulation and coding size of the first access point that the first access point is configured to use to transmit to a station during the time slice assigned to the first access point; where the determination of the number of time slices within the downlink transmission period is one of a static determination or a dynamic determination; where the operations further comprise determining a second number of second time slices within a second downlink transmission period that follows the downlink transmission period; where the operations further comprise determining at least one of a second length of the second time slices or a second assignment of the one or more access points to the second time slices for the second downlink transmission period; where each time slice in the time slices has a same length; where one or more of the time slices in the time slices has a different length; where a uniform number of access points in the one or more access points is assigned to each of the time slices; where a non-uniform number of access points in the one or more access points is assigned to each of the time slices; where a first time slice in the time slices is reserved for one or more outgoing access points in the one or more access points, and wherein a second time slice in the time slices is reserved for one or more incoming access points in the one or more access points; where a first access point in the one or more access points is a serving access point for a station, and wherein a second access point in the one or more access points is a backup serving access point for the station; where the first access point and the second access point are assigned to different time slices in the time slices; and where the downlink transmission period comprises one of a contention-based access period or a schedule period, and wherein the schedule period is rasterized.

Another aspect of the disclosure provides a method of transmitting wireless communications based on time slices. The method comprises: transmitting one or more beam pilots to one or more stations; obtaining interference data from the one or more stations; transmitting the interference data to an access point controller; and receiving a scheduling message indicating a time slice within a downlink transmission period during which an access point is configured to communicate with a first station in the one or more stations, wherein an assignment of the access point to the time slice is based at least in part on the interference data.

The method of the preceding paragraph can include any sub-combination of the following features: where the scheduling message indicates that the access point is assigned to the time slice and a second time slice; where the method further comprises transmitting a data packet to the first station during the time slice; where the scheduling message further indicates a start time of the time slice and one of a duration or an end time of the time slice; where the scheduling message indicates that the access point is allowed to transmit a first data packet to the first station and not a second station during the time slice; where the scheduling message indicates that the access point is allowed to transmit a first data packet to the first station using at least one of a first spatial beam or a first modulation and coding size (MCS) and not at least one of a second spatial beam or a second MCS during the time slice; where the assignment of the access point to the first station during the time slice is a static assignment; where one of a number of time slices within the downlink transmission period, a length of the time slices within the downlink transmission period, the assignment of the access point to the time slice, an assignment of the access point to the first station during the time slice, a calculation of a beam index, or a calculation of a modulation and coding size (MCS) is one of static or dynamic across the downlink transmission period and a second downlink transmission period; where the method further comprises receiving a second scheduling message indicating a second time slice within a second downlink transmission period that follows the downlink transmission period during which the access point is configured to communicate with a second station in the one or more stations; where the second scheduling message further indicates a length of time of the second time slice that is different than a length of time of the time slice; where the first scheduling message further indicates a second time slice within a second downlink transmission period that follows the downlink transmission period during which the access point is configured to communicate with a second station in the one or more stations; where each time slice in the downlink transmission period has a same length; where the time slice has a different length of time than a second time slice in the downlink transmission period; where one or more time slices in the downlink transmission period has a same length or a different length; where a uniform number of access points in the one or more access points is assigned to each of the time slices; where the access point and a second access point are assigned to the time slice, and where a third access point and no other access points are assigned to a second time slice in the downlink transmission period; where a uniform number or a non-uniform number of access points in the one or more access points is assigned to each of the time slices; where the time slice is reserved for one of an incoming access point or an outgoing access point; where the access point serves the first station and is one of an outgoing or incoming access point for a second station, and where a second time slice within the downlink transmission period is reserved for the access point to serve the second station and not the first station; where the access point is one of an outgoing or incoming access point for a second station, and where a duration of time for which the access point is regarded as an outgoing or incoming access point is based on an absolute time duration or a number of instances in which a scheduling algorithm of the access point controller is run; where the access point is a serving access point for the first station, and wherein a second access point is a backup serving access point for the first station; and where the second access point is assigned to a second time slice different than the time slice.

Another aspect of the disclosure provides non-transitory, computer-readable storage comprising computer-executable instructions, wherein the computer-executable instructions, when executed by an access point, cause the access point to: transmit one or more beam pilots to one or more stations; obtain interference data from the one or more stations; transmit the interference data to an access point controller; and receive a scheduling message indicating a time slice within a downlink transmission period during which an access point is configured to communicate with a first station in the one or more stations, wherein an assignment of the access point to the time slice is based at least in part on the interference data.

The non-transitory, computer-readable storage of the preceding paragraph can include any sub-combination of the following features: where the scheduling message indicates that the access point is assigned to the time slice and a second time slice; where the computer-executable instructions, when executed, further cause the access point to transmit a data packet to the first station during the time slice; where the scheduling message further indicates a start time of the time slice and one of a duration or an end time of the time slice; where the scheduling message indicates that the access point is allowed to transmit a first data packet to the first station and not a second station during the time slice; where the scheduling message indicates that the access point is allowed to transmit a first data packet to the first station using at least one of a first spatial beam or a first modulation and coding size (MCS) and not at least one of a second spatial beam or a second MCS during the time slice; where the assignment of the access point to the first station during the time slice is a static assignment; where the computer-executable instructions, when executed, further cause the access point to receive a second scheduling message indicating a second time slice within a second downlink transmission period that follows the downlink transmission period during which the access point is configured to communicate with a second station in the one or more stations; where the second scheduling message further indicates a length of time of the second time slice that is different than a length of time of the time slice; where the first scheduling message further indicates a second time slice within a second downlink transmission period that follows the downlink transmission period during which the access point is configured to communicate with a second station in the one or more stations; where each time slice in the downlink transmission period has a same length; where the time slice has a different length of time than a second time slice in the downlink transmission period; where a uniform number of access points in the one or more access points is assigned to each of the time slices; where the access point and a second access point are assigned to the time slice, and wherein a third access point and no other access points are assigned to a second time slice in the downlink transmission period; where the time slice is reserved for one of an incoming access point or an outgoing access point; where the access point is a serving access point for the first station, and wherein a second access point is a backup serving access point for the first station; and where the second access point is assigned to a second time slice different than the time slice.

Another aspect of the disclosure provides a wireless communication device for wireless communication. The wireless communication device comprises an antenna. The wireless communication device further comprises a processor in communication with the antenna, wherein computer-executable instructions, when executed by the processor, cause the wireless communication device to: transmit one or more beam pilots to one or more stations; obtain interference data from the one or more stations; transmit the interference data to an access point controller; and receive a scheduling message indicating a time slice within a downlink transmission period during which the wireless communication device is configured to communicate with a first station in the one or more stations, wherein an assignment of the wireless communication device to the time slice is based at least in part on the interference data.

The wireless communication device of the preceding paragraph can include any sub-combination of the following features: where the scheduling message indicates that the access point is assigned to the time slice and a second time slice; where the wireless communication device is further caused to transmit a data packet to the first station during the time slice; where the scheduling message further indicates a start time of the time slice and one of a duration or an end time of the time slice; where the scheduling message indicates that the access point is allowed to transmit a first data packet to the first station and not a second station during the time slice; where the scheduling message indicates that the access point is allowed to transmit a first data packet to the first station using at least one of a first spatial beam or a first modulation and coding size (MCS) and not at least one of a second spatial beam or a second MCS during the time slice; where the assignment of the access point to the first station during the time slice is a static assignment; where the wireless communication device is further caused to receive a second scheduling message indicating a second time slice within a second downlink transmission period that follows the downlink transmission period during which the access point is configured to communicate with a second station in the one or more stations; where the second scheduling message further indicates a length of time of the second time slice that is different than a length of time of the time slice; where the first scheduling message further indicates a second time slice within a second downlink transmission period that follows the downlink transmission period during which the access point is configured to communicate with a second station in the one or more stations; where each time slice in the downlink transmission period has a same length; where the time slice has a different length of time than a second time slice in the downlink transmission period; where a uniform number of access points in the one or more access points is assigned to each of the time slices; where the access point and a second access point are assigned to the time slice, and wherein a third access point and no other access points are assigned to a second time slice in the downlink transmission period; where the time slice is reserved for one of an incoming access point or an outgoing access point; where the access point is a serving access point for the first station, and wherein a second access point is a backup serving access point for the first station; and where the second access point is assigned to a second time slice different than the time slice.

BRIEF DESCRIPTION OF THE DRAWINGS

Embodiments of this disclosure will now be described, by way of non-limiting example, with reference to the accompanying drawings.

FIG. 2 is a timing diagram showing the assignment of APs to various time slices within a downlink (or uplink) transmission time period.

FIG. 4 is another timing diagram showing the assignment of APs to various time slices within a downlink (or uplink) transmission time period.

FIG. 5 is another timing diagram showing the assignment of APs to various time slices within a downlink (or uplink) transmission time period.

DETAILED DESCRIPTION OF CERTAIN EMBODIMENTS

Figure 1A:
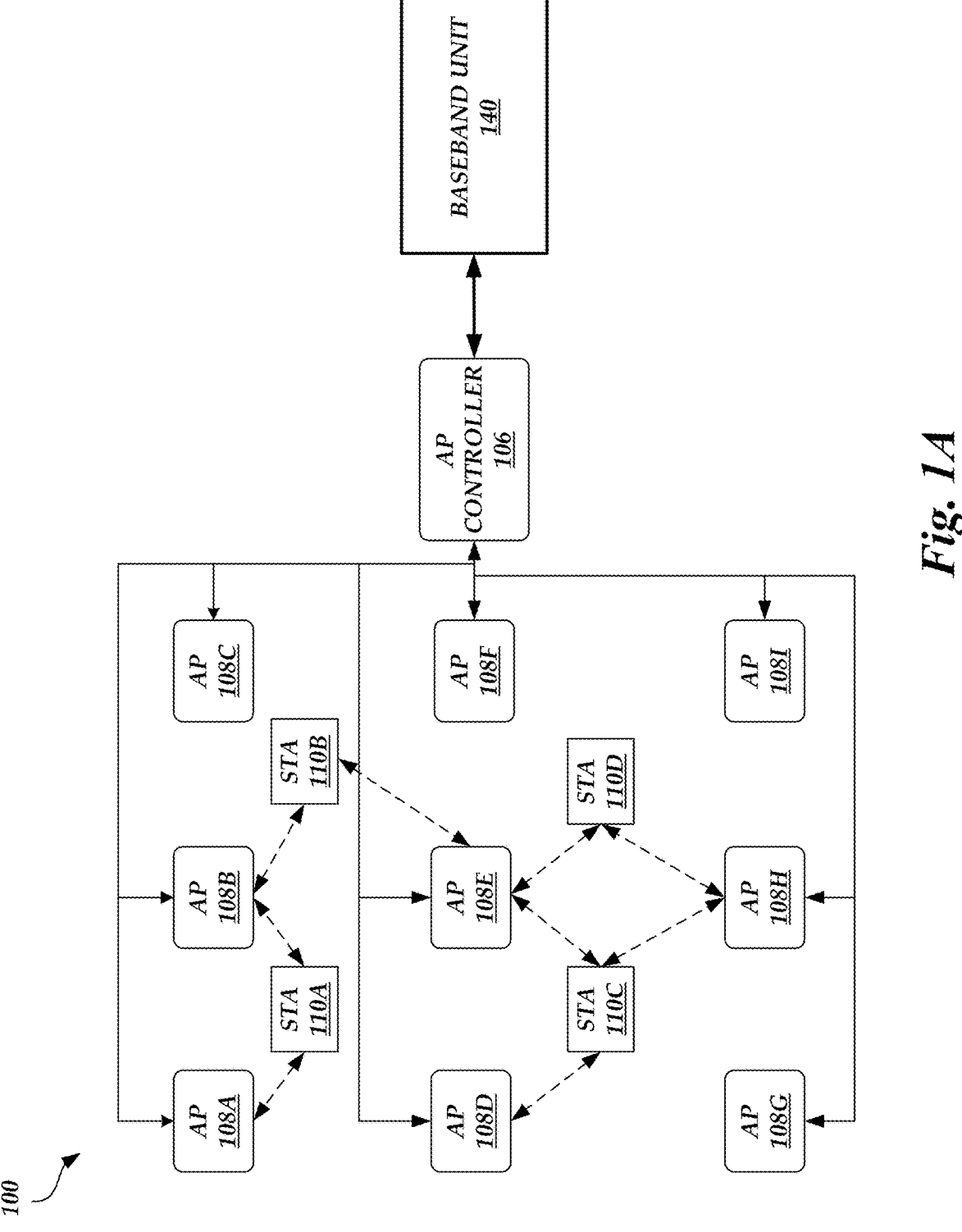
FIG. 1A is a diagram of a multipoint environment in which multiple stations and access points can communicate with each other according to an embodiment.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

As wireless networks are increasingly used to run services sensitive to reliability and/or latency issues (e.g., media streaming, video chat, virtual reality, augmented reality, etc.), any situations that negatively affect reliability and/or latency can be problematic. For example, an access point (AP) typically contends for access to a transmission medium shared with other APs in order to transmit a packet to one or more stations (STAs). In some cases, there may be 5, 10, 16, etc. APs contending for the same transmission medium during a given time period. This time period may also be referred to herein as a contention-based access period (CBAP). Typically, an AP is not allowed access to the transmission medium if another AP is in the process of transmitting a packet to one or more STAs using the transmission medium to avoid collisions between packets that could result in a STA not receiving an intended packet. Thus, as the number of APs contending for access to the same transmission medium increases, the less likely it is for any one AP to gain access to the transmission medium in a timely manner. As a result, there may be delays in packet transmission. Further, as the number of APs increases, channel sensing (e.g., the process used by an AP to sense the medium to decide whether the AP can initiate its own transmission or not) also becomes more challenging. This may lead to higher missed detections (e.g., where an AP misses detecting other ongoing transmissions, thus causing collisions when the AP initiates its own transmission) and/or higher false alarms (e.g., where an AP falsely detects other ongoing transmissions, thus causing unnecessary delays in initiating its own transmission).

One possibility for overcoming the issues with CBAP is to assign specific time periods to each AP during which the respective AP is allowed to begin transmitting over the transmission medium, where the time periods are rasterized or staggered over a time range (e.g., where the time periods are synchronized to a raster). Thus, each AP may be guaranteed a time period during the time range during which the respective AP can transmit over the transmission medium without having to contend for the transmission medium. However, like with CBAP, the time in between successive transmissions by a particular AP can be lengthy as the number of APs increases.

Both the previously-described CBAP and rasterized-based scheduling do not take into account the fact that some APs could be co-scheduled (e.g., transmit over the transmission medium concurrently or overlapping in time) because transmissions of these APs may not interfere with each other at a level that would affect reception of packets by STAs. Accordingly, described herein is a process for reducing contentions and/or packet collisions during downlink and/or uplink communications in a multipoint environment that uses time slice scheduling to overcome the technical deficiencies of CBAP and rasterized-based scheduling. For example, an AP controller (also referred to herein as a central controller) configured to communicate with one or more APs may obtain radio frequency (RF) signal strength and interference data from one or more APs and/or STAs and/or traffic load data, and can use this information to divide a time period into one or more time slices and to assign each AP to one or more of the time slices. In particular, the AP controller can use this information to determine a number of times slices in which to divide the time period and a length (e.g., in time) of each time slice, and assign one or more APs to each time slice in a manner such that the interference detected by one or more STAs served by an assigned AP resulting from other APs also assigned to the same time slice is below a threshold value. Thus, the AP controller can co-schedule multiple APs in a time slice to reduce transmission delays.

Within a time slice, the AP controller can set the scheduling to follow CBAP or a rasterized-based scheduling approach (also referred to herein as service period or schedule period (SP)). The AP controller can also set the assignment of APs to a time slice to be static or dynamic, and the scheduling implemented by a time slice can be static or change over time. Furthermore, the length of each time slice in a time period can be the same or different. In addition, an AP can be assigned to one or more time slices, and the number of APs assigned to any one time slice can be constant or varied across time slices. For the case of rasterized scheduling, the AP controller can also optimize (e.g., minimize) the raster separation between transmissions from different APs, using the signal strength and interference data. Additional features and implementations are described in greater detail below.

By creating time slices, assigning APs to these time slices, and implementing CBAP or rasterized-based scheduling in each time slice, the AP controller can take advantage of the benefits of CBAP and/or rasterization (e.g., collision reduction, which results in increased reliability) while also reducing AP transmission delays. As a result, services running on STAs sensitive to reliability and/or latency issues may have a higher level of performance.

As described in greater detail below, the multipoint environment in which the time slice scheduling is implemented enables a STA to communicate with multiple APs and an AP to communicate with multiple STAs in a single wireless protocol stack (e.g., a single IEEE 802.11 protocol stack). For example, a STA can authenticate simultaneously with multiple APs and decode any data packet that includes in a header a destination address that matches an address of the STA, irrespective of the source address included in the header of the data packet. Similarly, an AP can decode any data packet that includes in a header a destination address that matches an address of the AP or that matches a wildcard address associated with the AP, irrespective of the source address included in the header of the data packet.

Thus, unlike typical wireless network environments in which a basic service set (BSS) includes one AP assigned to one or more STAs, the multipoint environment described herein has no pre-defined AP to which a STA is associated. Rather, the AP transmitting a data packet to a particular STA can, in principle, change on a packet-by-packet basis (e.g., change in the AP transmitting data packets to a STA may happen due to change in RF channel conditions in the network). For example, a first AP can transmit a first data packet to a STA at a first time, a second AP can transmit a second data packet to the STA at a second time, a third AP can transmit a third data packet to the STA at a third time, the first AP can transmit a fourth data packet to the STA at a fourth time, and so on. In fact, the AP that transmits a data packet to the STA can change without the STA changing BSSs to which the STA is associated—the STA may remain in the same BSS using the same, single wireless stack while the AP that transmits data packets to the STA changes. Similarly, there may be no pre-defined STA to which an AP is associated. Rather, the STA transmitting a data packet to a particular AP can change on a packet-by-packet basis.

In an embodiment, the multipoint environment described herein is designed to operate at higher frequencies, such as at millimeter wave (mmW) frequencies, such as between 24 GHz to 300 GHz. In general, mmW frequencies can encompass at least some frequency ranges between 2 GHz to 3 GHz, at least some frequency ranges in the Super high frequency (SHF) bands (e.g., 3 GHz to 30 GHz), and/or at least some frequency ranges in the Extremely High Frequency (EHF) bands (e.g., 30 GHz to 300 GHz). The techniques described herein can be applied to networks operating at any suitable range of frequencies. In addition, the techniques described herein can be used for a variety of use cases, such as media streaming, video chat, virtual reality, augmented reality, etc.

Multipoint Time Slice Scheduling

FIG. 1A is a diagram of a multipoint environment 100 in which multiple STAs 110A-D and APs 108A-I can communicate with each other according to an embodiment. As illustrated in FIG. 1A, the multipoint environment 100 includes a plurality of APs 108A-I, a plurality of STAs 110A-D, an AP controller 106, and a baseband unit 140. In an embodiment, data packets can be wirelessly transmitted from the baseband unit 140 to the plurality of STAs 110A-D via one or more of the APs 108A-I. Similarly, data packets can be transmitted from the plurality of STAs 110A-D to one or more APs 108A-I.

As described herein, a STA 110A-D can communicate with multiple APs 108A-I and an AP 108A-I can communicate with multiple STAs 110A-D in a single wireless stack (e.g., a single IEEE 820.11 protocol stack). For example, a STA 110A-D can authenticate simultaneously with multiple APs 108A-I (e.g., one or more of the APs 108A-I can individual or collectively authenticate the STA 110A-D upon request from the STA 110A-D) and decode any data packet that includes in a header or preamble a destination address that matches an address of the STA 110A-D, irrespective of the source address included in the header or preamble of the data packet (e.g., the STA 110A-D can decode any data packet that includes in a header or preamble a destination address that matches an address of the STA 110A-D whether or not the source address is the address of a particular AP 108A-I). Similarly, an AP 108A-I can decode any data packet that includes in a header or preamble a destination address that matches an address of the AP 108A-I or that matches a wildcard address associated with the AP 108A-I, irrespective of the source address included in the header of the data packet (e.g., the AP 108A-I can decode any data packet that includes in a header or preamble a destination address that matches an address of the AP 108A-I or that matches a wildcard address associated with the AP 108A-I whether or not the source address is the address of a particular STA 110A-D). For example, a wildcard address may be an address associated with multiple APs 108A-I rather than a unique address associated with just one AP 108A-I. As one illustrative example, the address associated with multiple APs 108A-I could be one or more addresses of one or more STAs 110A-D that has authenticated with some or all of the APs 108A-I. Thus, the wildcard address can be one or more addresses of one or more authenticated STAs 110A-D. As another example, an AP 108A-I can decode any data packet that includes in a header or preamble a source address that matches an address of one of a set of STAs 110A-D, such as an address of a STA 110A-D that has already authenticated with the AP 108A-I or another AP 108A-I that is part of the same wireless protocol stack as the AP 108A-I, irrespective of whether the destination address in the header or preamble matches an address of the AP 108A-I (e.g., the AP 108A-I can decode any data packet that includes in a header or preamble a source address that matches an address of one of a set of STAs 110A-D that has already authenticated with the AP 108A-I or another AP 108A-I that is part of the same wireless protocol stack whether or not the destination address is the address of the AP 108A-I itself).

For the purposes of illustration and not meant to be limiting, STA 110A communicates with APs 108A and 108B, STA 110B communicates with APs 108B and 108E, STA 110C communicates with APs 108D, 108E, and 108H, and STA 110D communicates with APs 108E and 108H. The STAs 110A-D and APs 108A-I, however, can communicate with other APs 108A-I and STAs 110A-D. Thus, unlike typical wireless network environments in which a BSS includes one AP assigned to one or more STAs, the multipoint environment 100 has no pre-defined AP 108A-I to which a STA 110A-D is associated. Rather, the AP 108A-I transmitting a data packet to a particular STA 110A-D can change on a packet-by-packet basis. For example, the AP 108D can transmit a first data packet to the STA 110C at a first time, the AP 108E can transmit a second data packet to the STA 110C at a second time, the AP 108H can transmit a third data packet to the STA 110C at a third time, the AP 108D can transmit a fourth data packet to the STA 110C at a fourth time, and so on. In fact, the AP 108A-I that transmits a data packet to the STA 110A-D can change without the STA 110A-D changing BSSs to which the STA 110A-D is associated— the STA 110A-D may remain in the same BSS using the same, single wireless stack while the AP 108A-I that transmits data packets to the STA 110A-D changes. Similarly, there may be no pre-defined STA 110A-D to which an AP 108A-I is associated. Rather, the STA 110A-D transmitting a data packet to a particular AP 108A-I can change on a packet-by-packet basis.

The AP controller 106 can be configured to determine a number of time slices in which to divide a downlink (or uplink) transmission time period, determine a length of each time slice, determine an assignment of APs 108A-I to time slice(s), and select the AP 108A-I to transmit a data packet to a STA 110A-D. For example, the AP controller 106 can route traffic to one or more APs 108A-I for transmission to one or more STAs 110A-D based on downlink and/or uplink quality measurements. A downlink (DL) transmission generally refers to a communication from a network system (e.g., an AP) to a user terminal (e.g., a STA). An uplink (UL) transmission generally refers to a communication from the user terminal to the network system.

In the multipoint environment 100, base station functionality is subdivided between the baseband unit 140, the AP controller 106, and/or multiple remote radio units (RRUs) (e.g., APs 108A-I). An RRU may include multiple antennas, and one or more of the antennas may serve as a transmit-receive point (TRP). The RRU and/or a TRP may be referred to as a serving node, a base station, or an access point. The baseband unit 140 may be physically connected to the AP controller 106 and/or the RRUs, such as via an optical fiber connection. The baseband unit 140 and/or the AP controller 106 may provide operational details to an RRU to control transmission and reception of signals from the RRU along with control data and payload data to transmit. The RRU may provide data to the network received from STAs 110A-D within a service area associated with the RRU. An RRU can provide service to devices (e.g., STAs 110A-D) within a service area. For example, wireless downlink transmission service may be provided by an RRU to the service area to communicate data to one or more devices within the service area.

The APs 108A-I may each have one or more transmit antennas that each support one or more digital basebands. In some embodiments, each AP 108A-I has the same number of transmit antennas. In other embodiments, some or all APs 108*a*-I have a different number of transmit antennas than other APs 108A-I. Thus, the APs 108A-I may collectively be capable of transmitting N spatial beams, where N is the product of the number of APs 108A-I in the multipoint environment 100 and the number of transmit antennas operated by a single AP 108A-I. Similarly, each AP 108A-I can have the same number or different number of receive antennas. The baseband unit 140, the AP controller 106, and/or the APs 108A-I can be collectively referred to herein as a "network system."

Various standards and protocols may be included in the multipoint environment 100 to wirelessly communicate data between a base station (e.g., an AP 108) and a wireless communication device (e.g., a STA 110). Some wireless devices may communicate using an orthogonal frequency-division multiplexing (OFDM) digital modulation scheme via a physical layer. OFDM standards and protocols can include the third generation partnership project (3GPP) long term evolution (LTE), the Institute of Electrical and Electronics Engineers (IEEE) 802.16 standard (e.g., 802.16e, 802.16m), which may be known as WiMAX (Worldwide interoperability for Microwave Access), and the IEEE 802.11 standard, which may be known as Wi-Fi. In some systems, a radio access network (RAN) may include one or more base stations associated with one or more evolved NodeBs (also commonly denoted as enhanced NodeBs, eNodeBs, or eNBs), next generation NodeBs (gNBs), or any other suitable NodeBs (xNBs). In other embodiments, radio network controllers (RNCs) may be provided as the base stations. A base station provides a bridge between the wireless network and a core network such as the Internet. The base station may be included to facilitate exchange of data for the wireless communication devices of the wireless network.

The wireless communication device may be referred to as a station (STA) (e.g., for wireless communication devices that communicate using the IEEE 802.11 standard). The wireless communication device may also be referred to as a UE (e.g., for wireless communication devices that communicate in a RAN). The STA may be a device used by a user such as a smartphone, a laptop, a tablet computer, cellular telephone, a wearable computing device such as smart glasses or a smart watch or an ear piece, one or more networked appliances (e.g., consumer networked appliances or industrial plant equipment), an industrial robot with connectivity, or a vehicle. In some implementations, the STA may include a sensor or other networked device configured to collect data and wirelessly provide the data to a device (e.g., server) connected to a core network such as the Internet. Such devices may be referred to as Internet of Things devices (IoT devices).

The AP controller 106 can function as a router to route traffic between the baseband unit 140 and the APs 108A-I. The AP controller 106 can implement a relatively small amount of buffering. This can contribute to the AP controller 106 routing data between the baseband unit 140 and the APs 108A-I with low latency. The AP controller 106 can include any suitable hardware to implement the functionality described herein.

The APs 108A-I can be arranged as an array. All of the APs 108A-I can be connected to the AP controller 106. The APs 108A-I can be connected to the AP controller 106 via wired or wireless connections. Each AP 108A-I can buffer a relatively low amount of frames of data at a time. For example, an AP 108A can buffer 1 or 2 frames of data at a time in certain applications. The frames can be relatively big frames. For example, one frame can include 100 to 150 Internet protocol (IP) packets. The APs 108A-I are arranged to wirelessly communicate with STAs 110A-D. The APs 108A-I can communicate via any suitable wireless links, such as wireless local area network (WLAN) links. WLAN signals can have a shorter signal range than cellular signals. In some instances, the WLAN signals can have a range of about 300 feet or less. WLAN signals can have a range of about 150 feet or less in certain applications. An example of a WLAN link is a Wi-Fi link. The WLAN link can be implemented based on an IEEE 802.11 standard. The APs 108A-I are networking hardware devices that include any suitable physical hardware to implement the functionalities disclosed herein. Although APs are described with reference to certain embodiments for illustrative purposes, any suitable principles and advantages described with references to access points can be implemented with any other suitable serving nodes of a network system. Any suitable wireless link that meets latency and throughput specifications can be used. Wi-Fi links, millimeter wave (mmW) wireless area network (WAN) links, and fifth generation (5G) New Radio (NR) links in Frequency Range 2 (FR2) are examples of such suitable wireless links.

Figure 1B:
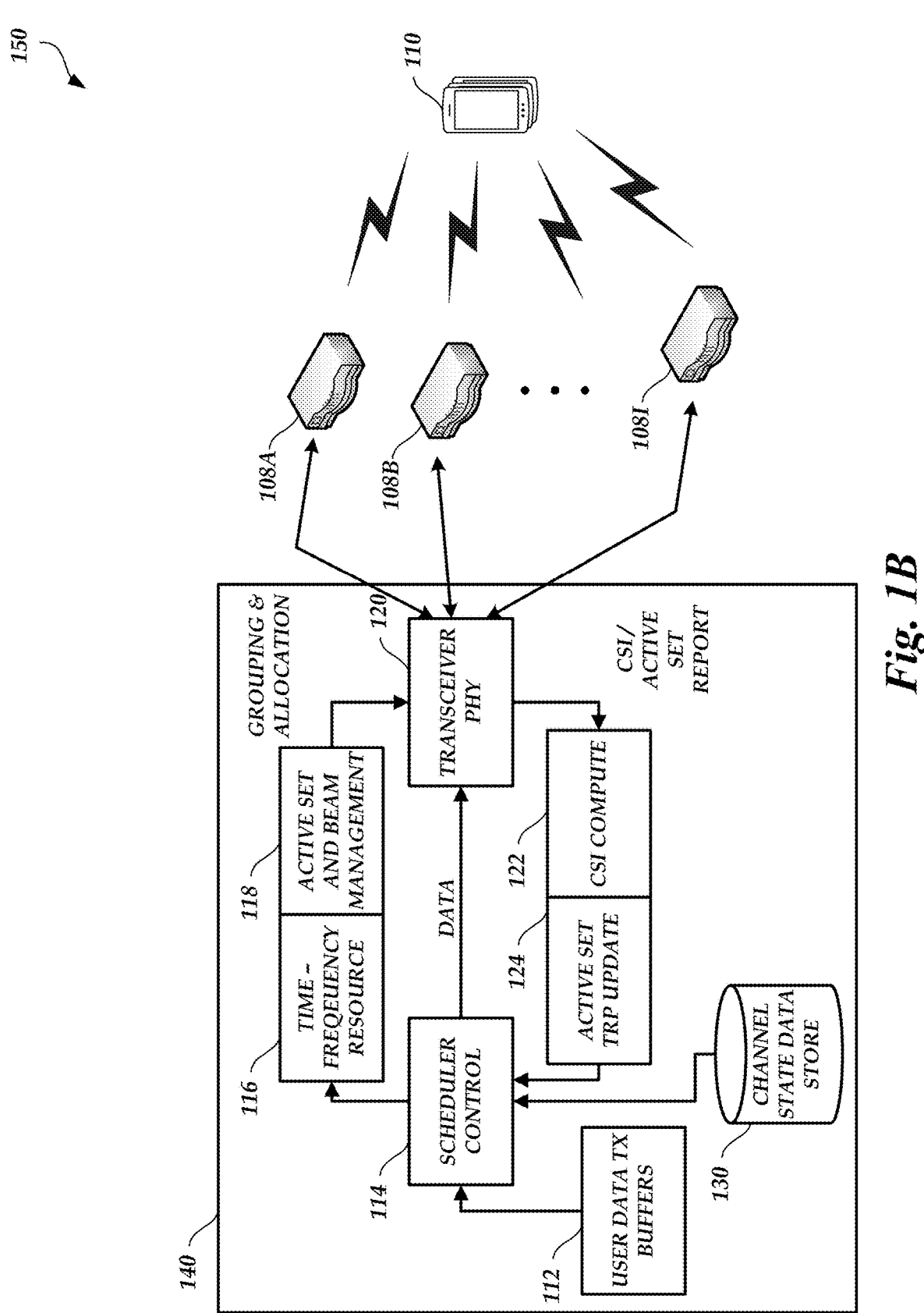
FIG. 1B is a schematic diagram illustrating a wireless network that includes the baseband unit according to an embodiment.

FIG. 1B is a schematic diagram illustrating a wireless network 150 that includes the baseband unit 140 according to an embodiment. In this embodiment, the APs 108A-I may operate as RRUs or serving nodes, and the baseband unit 140 and/or the AP controller 106 (not shown) may select users (e.g., STAs 110, STA 110 receive antennas, etc.) to be served by one or more APs 108A-I over one or more time slots and/or over one or more spatial dimensions.

As illustrated in FIG. 1B, the baseband unit 140 includes user data TX buffers 112, the scheduler control 114, a time/frequency resource allocation block 116, an active set and beam management block 118, a transceiver 120, a CSI computation block 122, an active set serving node update block 124, and the channel state data store 130. The baseband unit 140 can include any suitable physical hardware to implement the illustrated blocks. For example, the baseband unit 140 can include a processor and computer readable storage to implement any suitable blocks shown in FIG. 1B. The wireless network 150 also includes the APs 108A-I, one or more STAs 110, and/or the AP controller 106 (not shown). The wireless network 150 optionally includes other APs 108, not shown.

The baseband unit 140 and/or the AP controller 106 includes a scheduler that selects users to serve over one or more spatial dimensions over one or more time slots, selects APs 108A-I to serve user data, and schedules user data for wireless transmission between the APs 108A-I and STAs 110 over various spatial dimensions (e.g., spatial beams, channels, etc.). The scheduler can schedule DL data traffic, UL data traffic, or both. The scheduler can schedule data from any suitable number of APs 108 to any suitable number of UEs 110. The scheduler can include the user data queue TX buffers 112, the scheduler control 114, the time/frequency resource allocation block 116, the active set and beam management block 118, the CSI computation block 122, the active set serving node update block 124, and/or the channel state data store 130.

The transceiver 120 can provide a STA report received from the STA 110 to the scheduler. For example, the STA report can include spatial beam link strengths, spatial beam link quality, and/or other CSI suitable for allowing the scheduler to schedule DL data transmissions and/or to schedule UL data transmissions. The CSI computation block 122 can compute CSI data from data in the STA report. The active set serving node update block 124 can determine an updated active set for one or more STAs 110 based on updated link strength information provided by the STA(s)

110 (e.g., provided by the STA(s) 110 in response to receiving DL data traffic). In some instances, the active set serving node update block 124 can determine an updated active set for a subset of one or more antennas of a STA 110. The active set serving node update block 124 can use any suitable metrics disclosed herein to update an active set associated with a STA 110.

The transceiver 120 can also provide a beam visibility report received from the STA 110 and/or AP 108 to the scheduler. The beam visibility report can indicate which AP 108 has started transmitting UL data to a STA 110 in response to a blockage, obstruction, or other interference. For example, one AP 108 may have initially been serving a STA 110. Due to an obstruction or interference, however, another AP 108 may start serving the STA 110 instead. The beam visibility report can inform the scheduler of the new AP 108 that has started serving the STA 110 instead. The scheduler (e.g., the active set serving node update block 124) can use this information to determine an updated active set for the STA 110 (e.g., update information identifying the beam(s) serving the STA 110, which may now include the beam from the new AP 108 serving the STA 110, such that future DL transmissions to the STA 110 are completed using at least one of the identified beam(s)).

Alternatively or in addition, the beam visibility report can include information from a STA 110 indicating that the STA 110 cannot receive transmissions from a beam transmitted by an AP 108 originally assigned to serve the STA 110, but that the STA 110 can receive transmissions from a beam transmitted by another AP 108. The scheduler (e.g., the active set serving node update block 124) can use this information to determine an updated active set for the STA 110 (e.g., update information identifying the beam(s) serving the STA 110, which may now include the beam from the another AP 108 that the STA 110 can see, such that future DL transmissions to the STA 110 are completed using at least one of the identified beam(s)).

The updated active set data is provided to the scheduler control 114. The user data queue TX buffers 112 can provide user data (e.g., DL user data) to the scheduler control 114. The scheduler control 114 provides user data to the transceiver 120 and also provides instructions to the time/frequency resource allocation block 116. The time/frequency resource allocation block 116 can schedule timing and frequency of DL and/or UL data transmission from and/or to APs 108 (e.g., generate scheduling data), which can be forwarded to the APs 108 via the transceiver 120 and/or the AP controller 106. This can avoid timing conflicts and conflicts in the frequency domain. The active set and beam management block 118 can select APs 108 and/or specific spatial beams offered by these APs 108 for providing wireless transmission services to STAs 110, and create corresponding active sets for the STAs 110. The active set and beam management block 118 can group DL data transmissions and manage beamforming from the APs 108 to the STAs 110. The transceiver 120 provides data for transmission by the APs 108 to STAs 110.

As illustrated in FIG. 1B, the scheduler can cause a network system of the wireless network 150 to wirelessly transmit first user data to a first STA 110 across one or more spatial beams or spatial dimensions, to transmit second user data to a second STA 110 across one or more spatial beams or spatial dimensions, and so on. The scheduler can cause the transmissions of the first user data, the second user data, etc. to occur simultaneously and/or at different times. Moreover, the scheduler can cause a network system of the wireless network 150 to wirelessly transmit user data to any suitable number of STAs 110 across one or more spatial beams or spatial dimensions served by one or more APs 108.

FIG. 2 is a timing diagram showing the assignment of APs 108 to various time slices 210, 220, 230, and 240 within a downlink (or uplink) transmission time period. As illustrated in FIG. 2, the AP controller 106 has assigned a non-uniform number of APs 108 to each time slice 210, 220, 230, and 240. For example, the AP controller 106 has assigned APs 108A-C to time slice 210, APs 108D-E to time slice 220, APs 108F-H to time slice 230, and AP 108I to time slice 240. While the AP controller 106 has assigned a non-uniform number of APs 108 to each time slice 210, 220, 230, and 240 as depicted in FIG. 2, this is not meant to be limiting. For example, the AP controller 106 can assign a uniform (e.g., same) number of APs 108 to some or all of the time slices 210, 220, 230, and 240.

In addition, the length of each time slice 210, 220, 230, and 240 may or may not be the same. For example, the AP controller 106 may configure the length of time slice 210 to be longer than the length of time slice 240 given that more APs 108 are assigned to the time slice 210 than to the time slice 240. As another example, the AP controller 106 may configure the length of time slice 210 to be the same as the length of time slice 240 even though a different number of APs 108 are assigned to each time slice 210 and 240.

While FIG. 2 illustrates there being four time slices 210, 220, 230, and 240, this is not meant to be limiting. For example, the AP controller 106 can divide the downlink (or uplink) transmission time period into any number of time slices. Some of the factors that the AP controller 106 may consider in determining the number of time slices and/or the length of the time slices is described in greater detail below.

Within each time slice 210, 220, 230, and 240, the AP controller 106 may assign CBAP or SP to the respective time slice 210, 220, 230, and 240. As one example, the AP controller 106 may assign CBAP to the time slice 210. Thus, the APs 108A-C may contend with each other for access to the transmission medium. However, none of APs 108D-I may contend for the medium with APs 108A-C given that these APs 108D-I are assigned to different time slices 220, 230, and 240. Thus, the number of APs 108 contending at any one time may be less, thereby reducing data packet transmission latency.

As another example, the AP controller 106 may assign SP to the time slice 220. Thus, the AP controller 106 may assign a first time within the time slice 220 at which the AP 108D can start using the transmission medium and may assign a second time within the time slice 220 at which the AP 108E can start using the transmission medium. The first time and the second time may be offset on a raster with spacing time T r. Generally, given N APs 108 and N raster offsets (with one offset assigned to each AP 108 by, for example, an AP controller 106), an AP 108 may transmit a data packet at start time index n if $$(n-\text{offset})\text{modulo } N=0$$

The raster may ensure that one AP 108 is transmitting a header during any raster interval (e.g., multiple APs 108 may not transmit a header during the same raster interval). As a result, if a STA 110 detects a preamble for a data packet not intended for the STA 110, as long as the STA 110 can process and/or abort the processing of the header prior to the next raster start time, the STA 110 may not miss a preamble of a data packet actually intended for the STA 110 (e.g., given that subsequent preambles may be transmitted by APs 108 after the prior raster start time completes). In other words, the STAs 110 can continue to process preambles or headers in a manner as described herein, and abort the processing if the destination address in the header or preamble does not match the address of the respective STA 110. However, the APs 108 may be coordinated such that the APs 108 refrain from transmitting preambles or headers at the same time and/or overlapping in time. This may ensure that the STAs 110 are in a search state at the beginning of a raster interval if the STAs 110 are not already processing a data packet that is directed to the respective STA 110. These operations may reduce the likelihood that STAs 110 miss data packets due to the processing of preambles or headers that are for data packets not actually intended for the STAs 110.

To ensure that a STA 110 is in a data packet search state at the beginning of a raster interval (e.g., at a raster start time), the raster step $T_r$ may be at least equal to the maximum time, $T_d$, for a STA 110 to process and abort processing a preamble that has a mismatched destination (e.g., has a destination address that does not match the address of the STA 110). For example, the raster time interval, $T_r$, may be as follows:

$$T_r > T_d$$

Additional details of a rasterization-based approach can be found in U.S. patent application Ser. No. 17/230,783, entitled "SYSTEM AND METHOD FOR REDUCING DATA PACKET PROCESSING FALSE ALARMS" and filed on Apr. 14, 2021, which is hereby incorporated by reference herein in its entirety. Here, data packet transmission latency caused by typical rasterization implementations may be less of an issue given that fewer APs 108 would be synchronized to a raster during any given time slice.

The AP controller 106 may determine the number of time slices, the length of time slices, and/or the assignment of APs 108 to time slices for each downlink (or uplink) transmission time period or for multiple sets of downlink (or uplink) transmission time periods. For example, the AP controller 106 can keep any one of the time slice number, the time slice lengths, and/or the AP 108 time slice assignments static (e.g., unchanged) over different downlink (or uplink) transmission time periods. The AP controller 106 can also change any one of the time slice number, the time slice lengths, and/or the AP 108 time slice assignments across different downlink (or uplink) transmission time periods.

To determine the time slice number, the time slice lengths, and/or the AP 108 time slice assignments, the AP controller 106 can rely, at least in part, on signal strength and interference data and/or traffic load data. For example, the AP controller 106 may cause the APs 108 to transmit signals (e.g., synchronization signal block (SSB) signals), also referred to herein as beam pilots, for reception by the STAs 110A-D in a sequential manner. In particular, AP 108A may transmit a signal across a first spatial beam (e.g., $A_1$) using one or more AP 108A transmit antennas, then transmit a signal across a second spatial beam (e.g., $A_2$) using one or more AP 108A transmit antennas, and so on. After AP 108A has transmitted a signal across all of the spatial beams served by the AP 108A (e.g., $A_1$, $A_2$, $A_3$, and $A_4$), AP 108B can begin transmitting a signal across a first spatial beam (e.g., $B_1$) using one or more AP 108B transmit antennas, then transmit a signal across a second spatial beam (e.g., $B_2$) using one or more AP 108B transmit antennas, and so on. In total, each AP 108A-I may transmit, in sequence, one or more signals across each of the spatial beams served by the respective AP 108A-I (e.g., $A_1$, $A_2$, $A_3$, $A_4$, $B_1$, $B_2$, $B_3$, $B_4$, $C_1$, $C_2$, $C_3$, $C_4$, $D_1$, $D_2$, $D_3$, $D_4$, $E_1$, $E_2$, $E_3$, $E_4$, $F_1$, $F_2$, $F_3$, $F_4$, $G_1$, $G_2$, $G_3$, $G_4$, $H_1$, $H_2$, $H_3$, $H_4$, $I_1$, $I_2$, $I_3$, and $I_4$). The above example is provided merely for explanatory purposes, as the APs 108A-I can transmit the signals in any order (e.g., AP 108B can transmit signals before AP 108A, AP 108B can transmit a signal across a first spatial beam using one or more AP 108B transmit antennas after the AP 108A transmits a signal across a first spatial beam using one or more AP 108A transmit antennas and before the AP 108A transmits a signal across a second spatial beam using one or more AP 108A transmit antennas, etc.). The signals transmitted by each AP 108A-I may include the same physical cell ID (PCI), and therefore the signals may appear to the STAs 110A-D as if the signals are originating from the same AP or base station.

The STAs 110A-D can receive or detect a signal transmitted across a spatial beam and determine a link strength (e.g., a signal-to-interference-plus-noise ratio (SINR)) of the spatial beam using the received or detected signal. The STAs 110A-D can repeat this process for some or all of the spatial beams collectively served by the APs 108A-I. Each STA 110A-D can then provide an indication of the link strength of a spatial beam to one or more of the APs 108A-I via a control signaling channel and/or via in-band signaling (e.g., using the spatial channel over which data will be transmitted to and/or from the STAs 110A-D). The STAs 110A-D may provide the indication of the link strength for each spatial beam in the same transmission or in separate transmissions (e.g., where each transmission corresponds to a particular spatial beam). For example, if transmitting the indication of the link strength via in-band signaling, the STAs 110A-D may aggregate link strength data (e.g., aggregate the link strength determined for a plurality of spatial beams) and send the aggregated link strength data via a single or a small number of transmissions. For example, the STAs 110A-D can transmit a link strength vector, where each element of the vector includes an indication of the link strength of a particular spatial beam.

Alternatively or in addition, the STAs 110A-D may each determine a spatial beam with the best link strength (e.g., highest link strength). The STAs 110A-D may then transmit an indication of the spatial beam with the best link strength to the APs 108A-I, with or without also providing an indication of the link strengths of the other spatial beams.

The APs 108A-I can forward the link strength data to the AP controller 106. The AP controller 106 can then determine the time slice number, the time slice lengths, and the time slice AP 108A-I assignments. For example, in addition to providing the spatial beam link strengths, the STAs 110A-D may also provide an indication of a link quality and/or channel condition of each spatial beam, and the APs 108A-I can forward this information to the AP controller 106. The spatial beam link, the link quality, and/or the spatial beam channel conditions may collectively be referred to herein as "interference data." The AP controller 106 may also have information indicating the physical layout of the transmit antennas of the APs 108A-I and/or the direction in which such transmit antennas transmit and current and/or predicted traffic load data (e.g., information identifying the number of data packets that have been (e.g., current) or may be (e.g., predicted) scheduled for transmission by a particular AP 108A-I and/or to a particular STA 110A-D during a downlink transmission period).

The AP controller 106 may set the number of time slices to be a function of the number of serving APs 108A-I. For example, the AP controller 106 may set the maximum number of time slices to be equal to the total number of serving APs 108A-I. The AP controller 106 can then use interference determinations (described below) to determine whether an APs 108A-I can be co-scheduled with other APs 108A-I, which could result in a reduction of the number of time slices from the maximum number of time slices. Generally, the AP controller 106 may set the final number of time slices such that at least one AP 108A-I is assigned to each time slice.

Using the link strengths, the link qualities, and/or the transmit antenna physical layout and/or directional information, the AP controller 106 can determine whether a first AP 108A-I that is serving a first STA 110A-D would cause interference with the reception of data packets by a second STA 110A-D that are transmitted by a second AP 108A-I below (or above) a threshold value (e.g., below a threshold SINR ratio) if the first AP 108A-I is scheduled to serve the first STA 110A-D and the second AP 108A-I is scheduled to serve the second STA 110A-D during the same time slice. The AP controller 106 can repeat this determination for some or all combinations of APs 108A-I and STAs 110A-D. In further embodiments, the AP controller 106 can use the link strengths, the link qualities, and/or the transmit antenna physical layout and/or directional information to determine whether a first AP 108A-I that is using a first spatial beam to serve a first STA 110A-D would cause interference with the reception of data packets by a second STA 110A-D that are transmitted by a second AP 108A-I that is using a first spatial beam below (or above) a threshold value (e.g., below a threshold SINR ratio) if the first AP 108A-I is scheduled to serve the first STA 110A-D using the first AP's 108A-I first spatial beam and the second AP 108A-I is scheduled to serve the second STA 110A-D using the second AP's 108A-I first spatial beam during the same time slice. The AP controller 106 can repeat this determination for some or all combinations of APs 108A-I, AP 108A-I spatial beams, and STAs 110A-D.

Using the interference determinations, the AP controller 106 can determine whether one combination of an AP 108A-I serving a STA 110A-D can be co-scheduled with another combination of another AP 108A-I serving another STA 110A-D. For example, the AP controller 106 may determine that combination of an AP 108A-I serving a STA 110A-D can be co-scheduled with another combination of another AP 108A-I serving another STA 110A-D if the determined interference for the two combinations is below (or above) the threshold value.

The AP controller 106 can also use the interference determinations and/or the traffic loading data to predict, for a particular STA 110A-D, a transmission rate (e.g., in megabit per second) at which the respective STA 110A-D could receive a data packet if the respective STA 110A-D is served by a particular AP 108A-I (optionally over a particular spatial beam) and if other STAs 110A-D are served by other APs 108A-I during the same time slice. For example, if one AP 108A-I is serving the respective STA 110A-D and one or more other STAs 110A-D, this could negatively affect the transmission rate of the respective STA 110A-D. Thus, the AP controller 106 can predict, for a particular STA 110A-D, multiple transmission rates, one for each combination of (1) serving AP 108A-I and/or spatial beam of a serving AP 108A-I and (2) each combination of another AP 108A-I serving another STA 110A-D and/or each combination of a spatial beam of another AP 108A-I being used to serve another STA 110A-D. Optionally, the AP controller 106 may predict these transmission rates except for combinations in which the AP controller 106 has already determined that an AP 108A-I and STA 110A-D combination should not be co-scheduled with another AP 108A-I and STA 110A-D combination.

The AP controller 106 can use the transmission rates to determine which APs 108A-I should serve which STAs 110A-D, when the APs 108A-I should serve the corresponding STAs 110A-D (e.g., in which time slice), and/or which combination of AP 108A-I and STA 110A-D can be co-scheduled with another combination of AP 108A-I and STA 110A-D. For example, the AP controller 106 can select combinations of serving APs 108A-I and STAs 110A-D assigned to particular time slices that maximizes the transmission rate for the STA 110A-D that would otherwise have the lowest transmission rate of all the STA 110-D if this particular combination is selected. As another example, the AP controller 106 can select combinations of serving APs 108A-I and STAs 110A-D assigned to particular time slices that maximizes the sum of transmission rates of the STAs 110A-D. Optionally, the AP controller 106 can use one metric (e.g., maximizing a lowest STA 110A-D transmission rate or maximizing a sum of transmission rates) as a primary metric and use the other metric as a secondary metric that serves as a tiebreaker if the primary metric results in multiple possible combinations that satisfy the metric criteria.

In a further embodiment, the AP controller 106 can use the transmission rates to determine which spatial beams of which APs 108A-I should serve which STAs 110A-D, when the spatial beams of the APs 108A-I should serve the corresponding STAs 110A-D (e.g., in which time slice), and/or which combination of AP 108A-I spatial beam and STA 110A-D can be co-scheduled with another combination of AP 108A-I spatial beam and STA 110A-D. For example, the AP controller 106 can select combinations of spatial beams of serving APs 108A-I and STAs 110A-D assigned to particular time slices that maximizes the transmission rate for the STA 110A-D that would otherwise have the lowest transmission rate of all the STA 110-D if this particular combination is selected. As another example, the AP controller 106 can select combinations of spatial beams of serving APs 108A-I and STAs 110A-D assigned to particular time slices that maximizes the sum of transmission rates of the STAs 110A-D. Optionally, the AP controller 106 can use one metric (e.g., maximizing a lowest STA 110A-D transmission rate or maximizing a sum of transmission rates) as a primary metric and use the other metric as a secondary metric that serves as a tiebreaker if the primary metric results in multiple possible combinations that satisfy the metric criteria.

Once the AP controller 106 has assigned, APs 108A-I to time slices, the AP controller 106 can inform the APs 108A-I accordingly. For example, the AP controller 106 can transmit to each AP 108A-I a scheduling message that indicates a number of time slices assigned to the respective AP 108A-I, a start time of the assigned time slice(s), and either a duration of the assigned time slice(s) or an end time of the assigned time slice(s). optionally, the scheduling message or another message may indicate whether the assigned time slice(s) are CPAB or SP. In the case of SP, rasterization-related parameters can also be provided in the scheduling message. The AP controller 106 can also provide additional scheduling-related parameters to the APs 108A-I, such as the beam index and a modulation and coding size (MCS) index to be used by an AP 108A-I to serve a STA 110A-D. Once an AP 108A-I receives a scheduling message, the AP 108A-I may constrain itself to contend for the transmission medium and/or transmit during the assigned time slice(s).

As described above, the AP controller 106 can keep any one of the time slice number, the time slice lengths, and/or the AP 108 time slice assignments static (e.g., unchanged)

over different downlink (or uplink) transmission time periods or change any one of the time slice number, the time slice lengths, and/or the AP 108 time slice assignments across different downlink (or uplink) transmission time periods. If the AP controller 106 changes any one of the time slice number, the time slice lengths, and/or the AP 108 time slice assignments across different downlink (or uplink) transmission time periods, then the AP controller 106 may cause the APs 108A-I to provide interference data in a manner as described above so that the AP controller 106 can repeat some or all of the operations described above to determine new AP 108A-I and/or AP 108A-I spatial beam time slice assignments, new time slice numbers, and/or new time slice lengths for an upcoming downlink (or uplink) transmission time period. Thus, the AP controller 106 may cause the APs 108A-I to provide interference data once before one or more downlink (or uplink) transmission time periods (e.g., in a static configuration) so that time slice assignments, time slice numbers, and/or time slice lengths can be determined, or the AP controller 106 may cause the APs 108A-I to provide interference data periodically (e.g., in a dynamic configuration), such as prior to a new downlink (or uplink) transmission time period, so that the time slice assignments, time slice numbers, and/or time slice lengths can be determined and/or updated. As an illustrative example, time slice assignments, time slice numbers, and/or time slice lengths can be determined and/or updated periodically, such as every 20 ms, 40 ms, 50 ms, etc.

Figure 3:
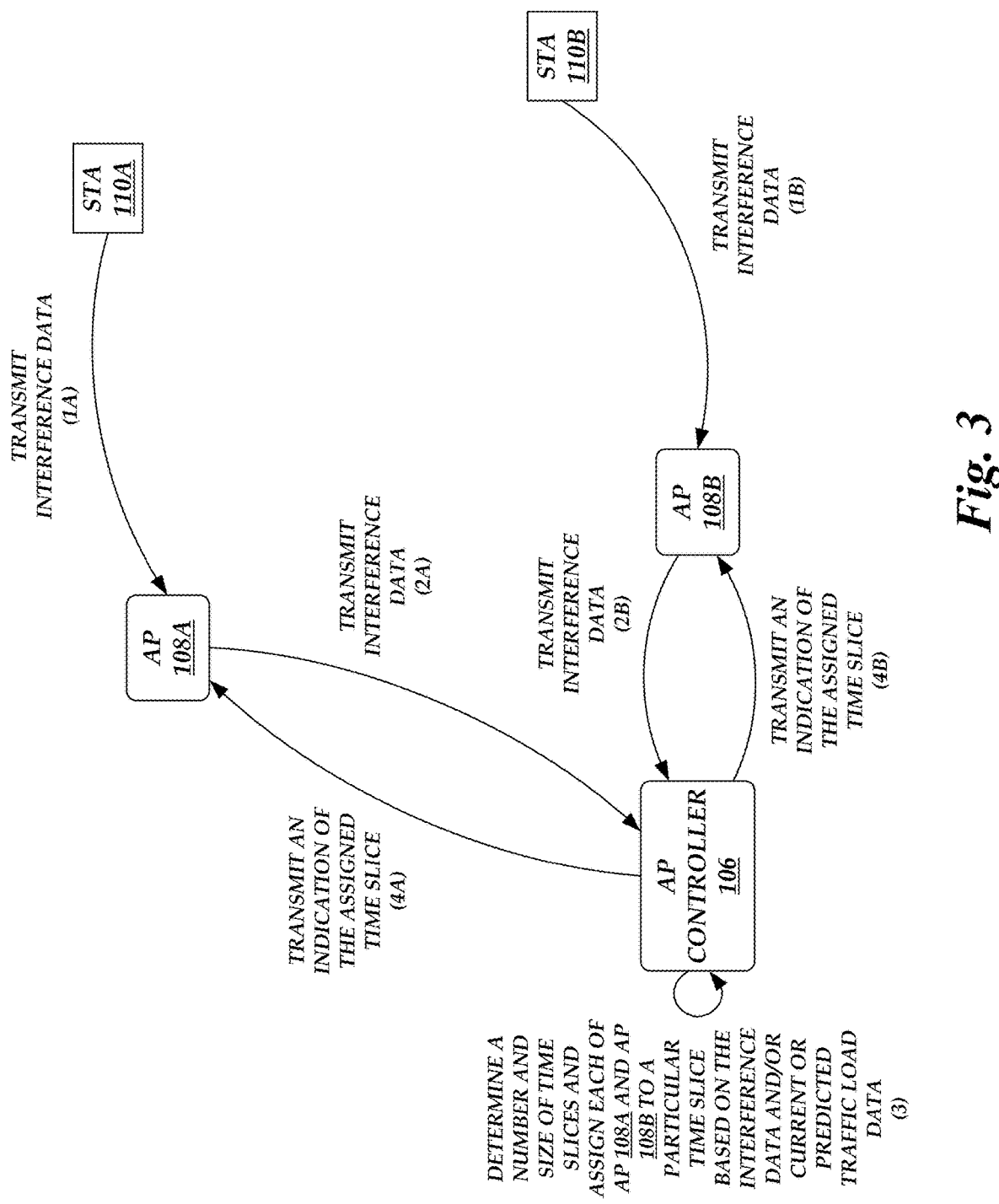
FIG. 3 is a block diagram of the multipoint environment of FIG. 1A illustrating the operations performed by the components of the multipoint environment to determine time slice assignments, time slice numbers, and/or time slice lengths, according to an embodiment.

FIG. 3 is a block diagram of the multipoint environment 100 of FIG. 1A illustrating the operations performed by the components of the multipoint environment 100 to determine time slice assignments, time slice numbers, and/or time slice lengths, according to an embodiment. As illustrated in FIG. 3, STA 110A transmits interference data to the AP 108A at (1A), and STA 110B transmits interference data to the AP 108B at (1B). The interference data may include the spatial beam link, the link quality, and/or the spatial beam channel conditions. The STAs 110A-B can obtain and provide the interference data in response to SSBs transmitted by the APs 108A-B, which may be transmitted in response to an instruction from the AP controller 106.

The AP 108A can transmit the interference data to the AP controller 106 at (2A), and the AP 108B can transmit the interference data to the AP controller 106 at (2B). The AP controller 106 can then determine a number and size (e.g., length) of time slices and assign each of AP 108A and AP 108B to a particular time slice based on the interference data and/or current or predicted traffic load data at (3). As part of such scheduling, the AP controller 106 can also calculate the beam indices and MCS indices to be used by an AP 108A-I to serve a STA 110A-D, inside the different possible slices assigned to the AP 108A-I. The number of time slices, the sizes of time slices, the assignment of an AP 108 to a time slice, the assignment of a STA 110 to be served by AP 108 in an assigned slice, the calculation of the beam indices, and/or the calculation of the MCS indices can be static over time across different downlink transmission periods or change dynamically over time across different downlink transmission periods (e.g., the AP controller 106 may determine new time slice numbers, new time slice sizes, new AP 108 time slice assignments, new assignments of STAs 110 to be served by APs 108, new beam indices, and/or new MCS indices for individual downlink transmission periods, such as for each downlink transmission period). Once this information is determined, the AP controller 106 can transmit an indication of the time slice assigned to the AP 108A to the AP 108A at (4A) via a scheduling message, and can transmit an indication of the time slice assigned to the AP 108B to the AP 108B at (4B) via a scheduling message.

FIG. 4 is another timing diagram showing the assignment of APs 108A-F to various time slices 410, 420, 430, and 440 within a downlink (or uplink) transmission time period. As illustrated in FIG. 4, the AP controller 106 has not only assigned APs 108A-F to at least one time slice 410, 420, 430, and 440, but the AP controller 106 has further assigned a particular combination of AP 108A-F and STA 110A-E to each time slice 410, 420, 430, and 440.

For example, the AP controller 106 has assigned APs 108A and 108E to time slice 410, and has further configured the time slice 410 such that the AP 108A is only allowed to communicate with the STA 110A during the time slice 410 and such that the AP 108E is only allowed to communicate with the STA 110C during the time slice 410. Likewise, the AP controller 106 has assigned AP 108B to time slice 420, and has further configured the time slice 420 such that the AP 108B is only allowed to communicate with the STA 110B during the time slice 420. The AP controller 106 has also assigned AP 108E to time slice 430, and has further configured the time slice 430 such that the AP 108E is only allowed to communicate with the STA 110D during the time slice 430. Finally, the AP controller 106 has assigned AP 108F to time slice 440, and has further configured the time slice 440 such that the AP 108F is only allowed to communicate with the STA 110E during the time slice 440. The AP controller 106 may indicate which STA(s) 110 an AP 108 may communicate with during an assigned time slice in the scheduling message transmitted to the AP 108.

In further embodiments, not only does the AP controller 106 configure a time slice such that an AP 108 can only serve one or more specific STAs 110 during the time slice, the AP controller 106 can further configure a time slice such that an AP 108 can only use one or more specific spatial beams to serve one or more specific STAs 110 during the time slice. The AP controller 106 may indicate which spatial beam(s) an AP 108 may use to communicate with one or more STAs 110 during an assigned time slice in the scheduling message transmitted to the AP 108.

FIG. 5 is another timing diagram showing the assignment of APs 108A-G to various time slices 510, 520, 530, and 540 within a downlink (or uplink) transmission time period. In some situations, a handover event may occur in which the AP controller 106 changes the serving AP 108 for a STA 110 from one AP 108 to another AP 108. For latency critical applications, it may be beneficial to provision one or more time slices during a handover instance to allow an outgoing AP 108 (e.g., an AP 108 that was previous a serving AP 108 to a STA 110 and that will no longer be the serving AP 108) to transmit any remaining data packets in its queue before the responsibility for serving a STA 110 is handed off to an incoming AP 108 (e.g., an AP 108 that will become the serving AP 108 to a STA 110) and/or to allow an incoming AP 108 to set up communication with the STA 110 and/or to boost their medium resource availability immediately or nearly immediately after a handover event to account for any delays in application of the new schedule sent by the AP controller 106.

As illustrated in FIG. 5, APs 108B-C may be incoming APs and APs 108D-E may be outgoing APs. As a result, the AP controller 106 may reserve time slice 510 for the incoming APs 108B-C and may reserve time slice 520 for the outgoing APs 108D-108E. While FIG. 5 illustrates the incoming APs 108B-C as having the same reserved time slice 510 and the outgoing APs 108D-E as having the same reserved time slice 520, this is not meant to be limiting. For example, the AP controller 106 can reserve different time slices for different incoming and/or outgoing APs 108. Incoming APs 108B-C and AP 108H may also be assigned to time slice 530, which represents a normally-assigned time slice. Thus, the AP controller 106 has assigned the incoming APs 108B-C to both an incoming time slice 510 and a normal time slice 530. Finally, the AP controller 106 has reserved time slice 540 for the AP 108G.

In general, an AP 108 that is an outgoing serving AP 108 for one or more STAs 110 may continue to be a serving AP 108 for other STA(s) 110. When the AP controller 106 assigns a time slice to this AP 108 (which may be a slice from among those time slices reserved for outgoing APs only, such as time slice 520), the AP controller 106 may restrict the AP 108 to serve within this time slice only those STAs 110 or a subset of those STAs 110 for which this AP 108 is indeed an outgoing AP 108.

Similarly, an AP 108 that is the incoming serving AP 108 for one or more STAs 110 may already be a serving AP 108 for other STA(s) 110. When the AP controller 106 assigns a time slice to this AP 108 (which may be a slice from amongst those reserved for incoming APs 108 only, such as time slice 510), the AP controller 106 may restrict the AP 108 to serve within this time slice only those STAs 110 or a subset of those STAs 110 for which this AP 108 is indeed an incoming AP 108.

The duration for which the AP controller 106 regards an AP 108 to be an incoming AP 108 (or an outgoing AP) from the time the AP 108 became an incoming AP 108 (or an outgoing AP) can be a configurable duration. For example, the duration could either be an absolute time duration or the duration could be a duration specified in terms of the number of instances the AP controller 106 scheduling algorithm is run. The duration for which the AP controller 106 regards an AP 108 to be an incoming AP 108 and the duration for which the AP controller 106 regards an AP 108 to be an outgoing AP 108 could be identical or distinct.

Figure 6:
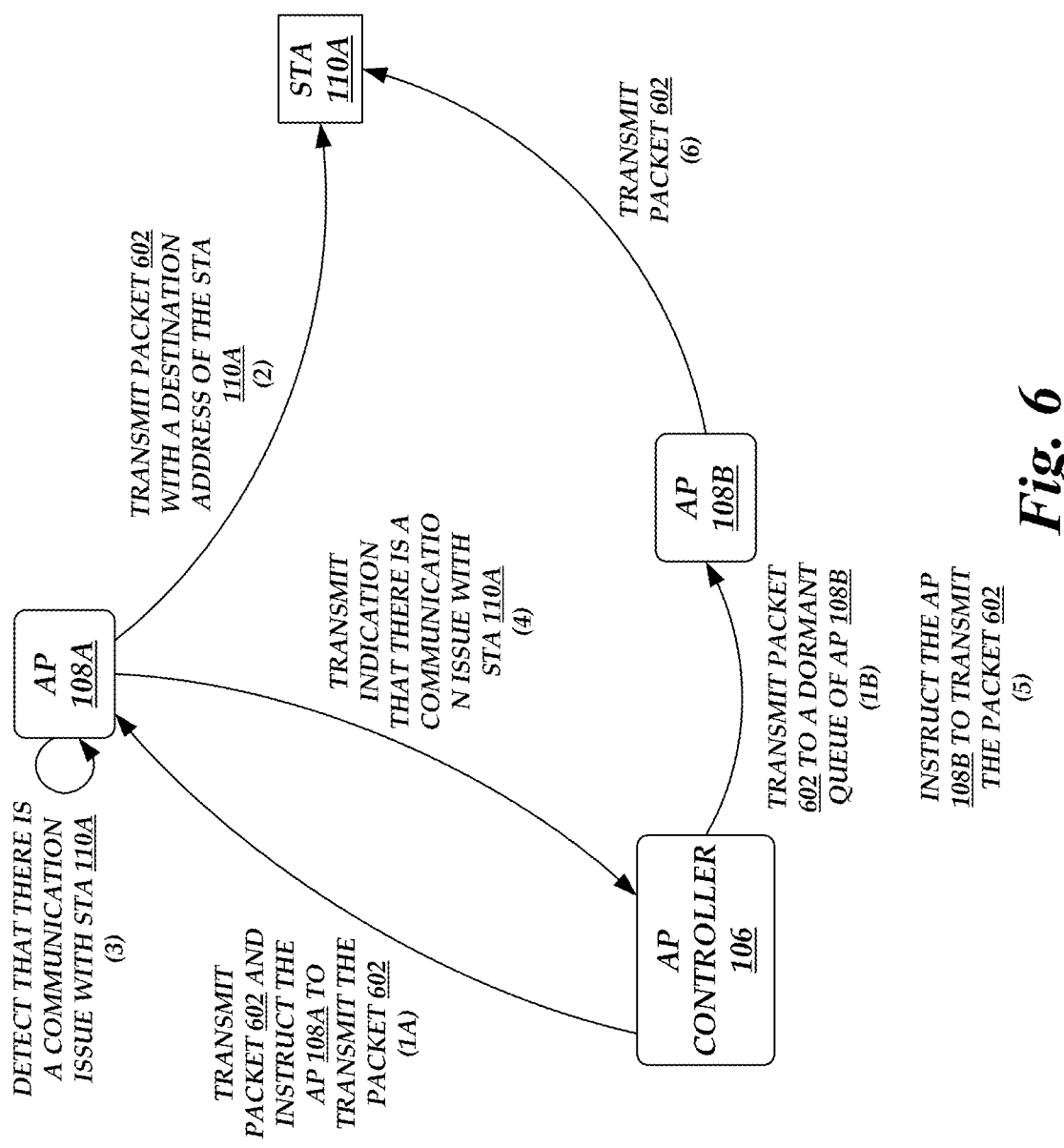
FIG. 6 is a block diagram of the multipoint environment of FIG. 1A illustrating the operations performed by the components of the multipoint environment to select backup serving APs, according to an embodiment.

FIG. 6 is a block diagram of the multipoint environment 100 of FIG. 1A illustrating the operations performed by the components of the multipoint environment 100 to select backup serving APs 108, according to an embodiment. For example, the AP controller 106 can configure a serving AP 108 for a STA 110 and one or more backup serving APs 108 for the STA 110. A backup serving AP 108 may serve the STA 110 in situations in which the transmission of some data packets from the serving AP 108 fails. The AP controller 106 may assign backup serving APs 108 to a STA 110 in the same manner as described above with respect to serving APs 108, but may prioritize the assignment of serving APs 108 to time slices over the assignment of backup serving APs 108 to time slices to improve the likelihood that serving APs 108 are spread out into as many different time slices as possible. In particular, the AP controller 106 can first minimize the reuse of time slices among the serving APs 108 by distributing the serving APs 108 over the available time slices first. Subsequently, the AP controller 106 can distribute the backup serving APs 108 over the time slices. As mentioned above, the number of time slices may be dependent on the number of APs 108 serving STAs 110. In situations in which backup serving APs 108 are assigned, the AP controller 106 may set the number of time slices to be dependent on the number of serving APs 108 in the network or dependent on the number of serving APs 108 plus the number of outgoing APs 108 in the network. In addition, a backup serving AP 108 may be assigned to the same time slice or a different time slice than the serving AP 108.

As illustrated in FIG. 6, the AP controller 106 has assigned serving and backup serving APs 108 to STAs 110. At (1A), the AP controller 106 transmits to the AP 108A packet 602 and an instruction to transmit the packet 602, and at (1B) transmits to a dormant queue of the AP 108B the packet 602. The AP 108A then transmits the packet 602 to the STA 110A with a destination address of the STA 110A at (2). However, the STA 110A may have trouble receiving the packet 602 (e.g., due to interference from other APs, STAs, or environmental conditions; low transmission power; etc.). The AP 108A may detect that there is a communication issue with the STA 110A at (3) and transmit an indication to the AP controller 106 that there is a communication issue with the STA 110A at (4).

The AP controller 106 can then instruct the AP 108B to transmit the packet 602 at (5) given that the AP 108B has been assigned as the backup serving AP 108B for the STA 110A. The AP 108B then transmits the packet 602 from the dormant queue to the STA 110A at (6).

Figure 7:
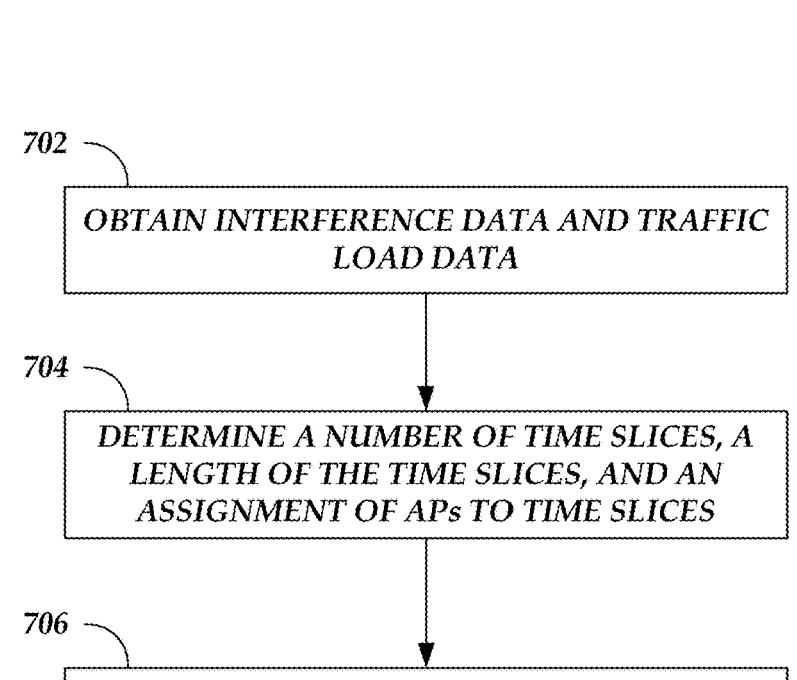
FIG. 7 is a flow diagram depicting a time slice assignment routine illustratively implemented by an AP controller, according to one embodiment.

FIG. 7 is a flow diagram depicting a time slice assignment routine 700 illustratively implemented by an AP controller, according to one embodiment. As an example, the AP controller 106 can be configured to execute the time slice assignment routine 700. The time slice assignment routine 700 begins at block 702.

At block 702, interference data and traffic load data are obtained. For example, the interference data can be obtained from STAs 110 via APs 108. The traffic load data may be known to the AP controller 106 given that the AP controller 106 and/or baseband unit 140 may be performing scheduling operations.

At block 704, a number of time slices, a length of time slices, and an assignment of APs to time slices is determined, alongside determinations of beam indices and/or MCS indices to be used by the APs 108. For example, the number of time slices may be determined based on the number of serving APs 108 in the network. The length of time slices and/or the assignment of APs to time slices may be determined based on the interference data and/or the traffic load data.

At block 706, a scheduling message is transmitted to each AP indicating an assignment time slice to the respective AP. The scheduling message may indicate a number of assigned time slices, a start time of each assigned time slice, a duration or end time of each assigned time slice, STAs 110 with which the AP 108 can communicate during the assigned time slice(s) (if applicable), and/or spatial beam(s) and MCSs that the AP 108 can use to communicate with STAs 110 during the assigned time slice(s) (if applicable).

Figure 8:
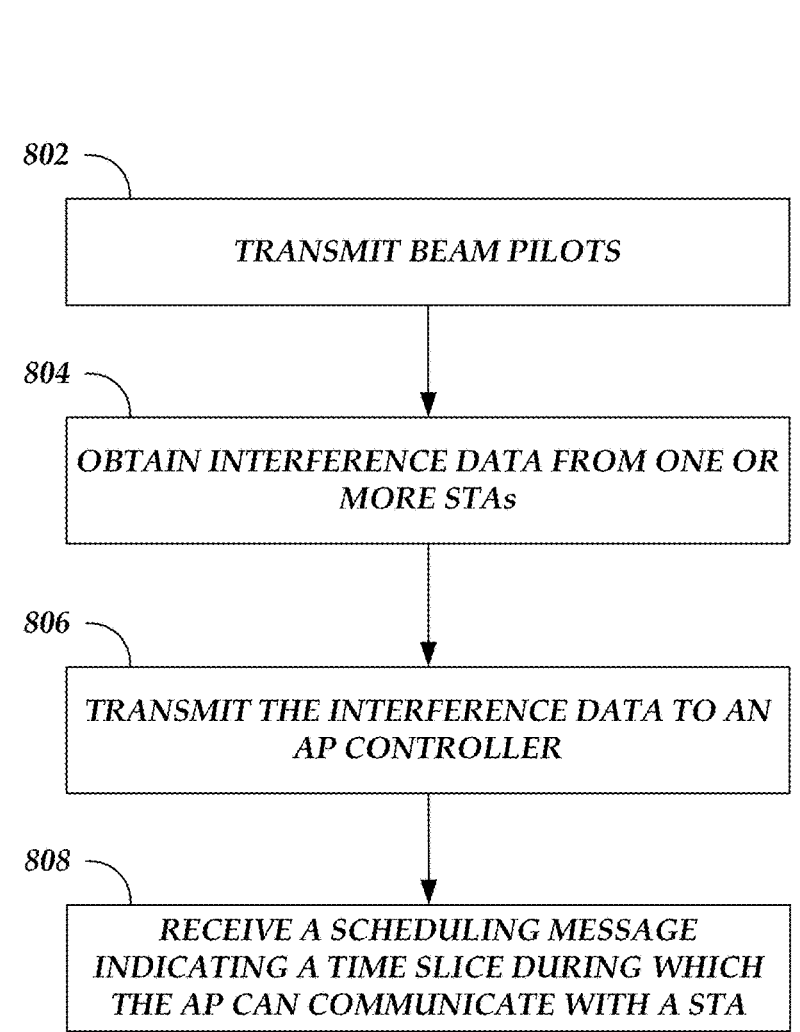
FIG. 8 is a flow diagram depicting a time slice-based transmission routine illustratively implemented by an AP, according to one embodiment.

FIG. 8 is a flow diagram depicting a time slice-based transmission routine 800 illustratively implemented by an AP, according to one embodiment. As an example, the AP 108 can be configured to execute the time slice-based transmission routine 800. The time slice-based transmission routine 800 begins at block 802.

At block 802, beam pilots are transmitted. For example, the beam pilots may be transmitted in response to an instruction from the AP controller. The beam pilots may be transmitted for reception by various STAs 110 such that the STAs 110 can measure SINR or other link quality measures. Alternatively, the pilots may be transmitted by the STAs 110, and used by APs 108 to infer the signal strength and interference data on the uplink, and then by exploiting uplink-downlink reciprocity (e.g., in a time division duplex (TDD) system) be used by APs 108 and/or the AP controller 106 to perform downlink scheduling determination.

At block 804, interference data from one or more STAs is obtained. The interference data can include SINR or other link quality measures measured by the STAs.

At block 806, the interference data is transmitted to an AP controller. The AP controller can use the interference data to determine time slice assignments, a time slice number, time slice lengths, and/or the like.

At block 808, a scheduling message is received indicating a time slice during which the AP can communicate with a STA. The AP can then begin communicating with the STA when the time slice begins.

Figure 9:
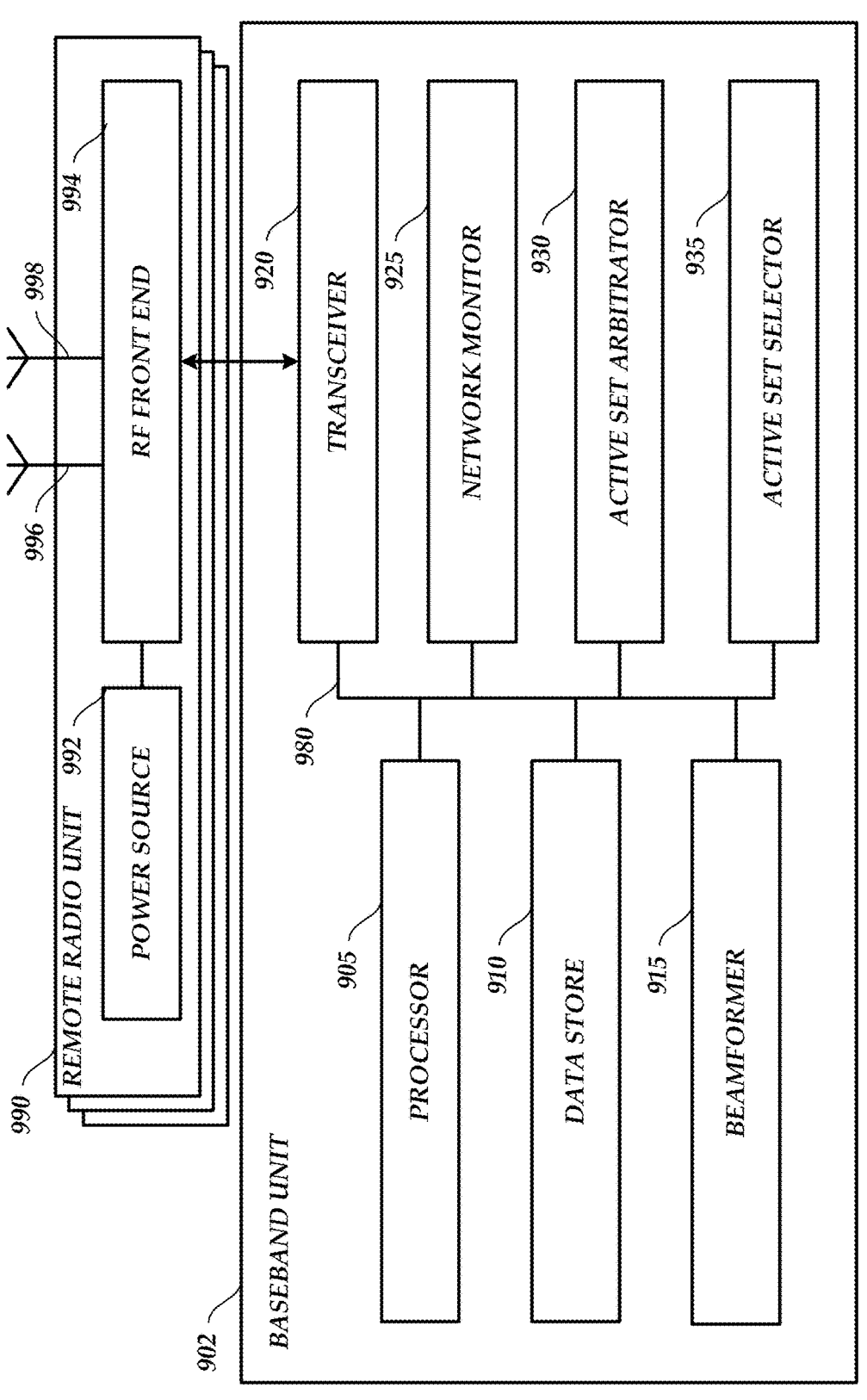
FIG. 9 is a block diagram illustrating an example baseband unit and remote radio unit according to an embodiment.

FIG. 9 is a block diagram illustrating an example baseband unit 902 and remote radio unit 990 according to an embodiment. The baseband unit 902 may be coupled with at least one remote radio unit 990. The remote radio unit 990 may include at least a first antenna 996 and a second antenna 998 for MIMO wireless communications. Any antenna disclosed herein, such as the antenna 996 or the antenna 998, can be referred to as antenna element. The first antenna 996 and the second antenna 998 may be coupled with a RF front end 994. The RF front end 994 may process signals received via the first antenna 996 and the second antenna 998. Part of processing a signal may include transmitting the signal to a transceiver 920 included in the BBU 902.

A processor 905 may receive signals received by the transceiver 920. The processor 905 may be configured to determine a type of the signal. For example, if the signal includes a request for connection services, the processor 905 may provide the signal to an active set selector 935. The active set selector 935 may be configured to identify an active set of serving nodes to provide the requested downlink data transmission service. The active set selector 935 can identify the active set for a STA based on information associated with the STA. Alternatively or additionally, the active set selector 935 can identify the active set for a STA based on information associated with one or more other STAs. In some instances, the active set selector 935 can identify specific spatial beam(s) selected to serve a STA. The BBU 902 may include a network monitor 925 to detect characteristics of the network such as the number of STAs served by each RRU, network data transmission load, and/or the like. The active set selector 935 may receive the network characteristics from the network monitor 925 as a factor considered when selecting spatial beam(s) to serve a STA and/or identifying an active set for a STA.

A beamformer 915 may be included in the BBU 902 to further identify parameters for the serving nodes (e.g., RRUs) included in an active set. The parameters may include one or more of transmission mode, time, frequency, power, beamforming matrix, tone allocation, or channel rank. The beamformer 915 may determine optimal parameters for RRUs coupled with the BBU 902 that facilitate a network-wide optimization of downlink data transmissions. In some implementations, the active set selector 935 determines an active set for a STA based, in part, on information provided by the STA. In other implementations, a UE may provide a requested active set. The BBU 902 may include an active set arbitrator 930 to reconcile a requested active set with an active set selected by the active set selector 935. The active set arbitrator 930 may compare a requested set of serving nodes to the serving nodes identified by the active set selector 935. The comparison may include ordering the serving nodes according to the STA recommendation. In some implementations, the active set arbitrator 930 may provide a message to the STA indicating confirmation or other assessment for a requested active set. For example, if the STA requested nodes A and B but the BBU 902 identified only B in the active set, the message may include a code indicating a partial match for the active set. Other status codes may be included to facilitate efficient communication and assessment of requested active sets. The active set arbitrator 930 may additionally or alternatively compare a requested transmission mode to the transmission mode identified by the active set selector 935 or other element of the BBU 902.

The BBU 902 may include a data store 910. The data store 910 may include instructions that can be executed by the processor 905 to implement the features described herein. In some implementations, the data store 910 may retain active sets or other scheduling information assigned to STAs served by the BBU 902 and/or channel state information. The data store 910 may be indexed by STA identifier and/or RRU identifier. This can expedite identification of previously communicated scheduling information for the STA and for monitoring network conditions (e.g., number of STAs allocated to an RRU or antenna element of an RRU).

In addition to providing the scheduling information to the STA, the scheduling information may be used to configure the RRU 990. The configuration may include adjusting the first antenna 996 such as by frequency modulation, time modulation, altering transmission power from a power source 992, or adjusting direction, tone allocation, or beamforming of the transmission.

As discussed above, a variety of different STAs can wirelessly communicate with serving nodes in a multipoint network. An example STA will be discussed with reference to FIG. 10.

Figure 10:
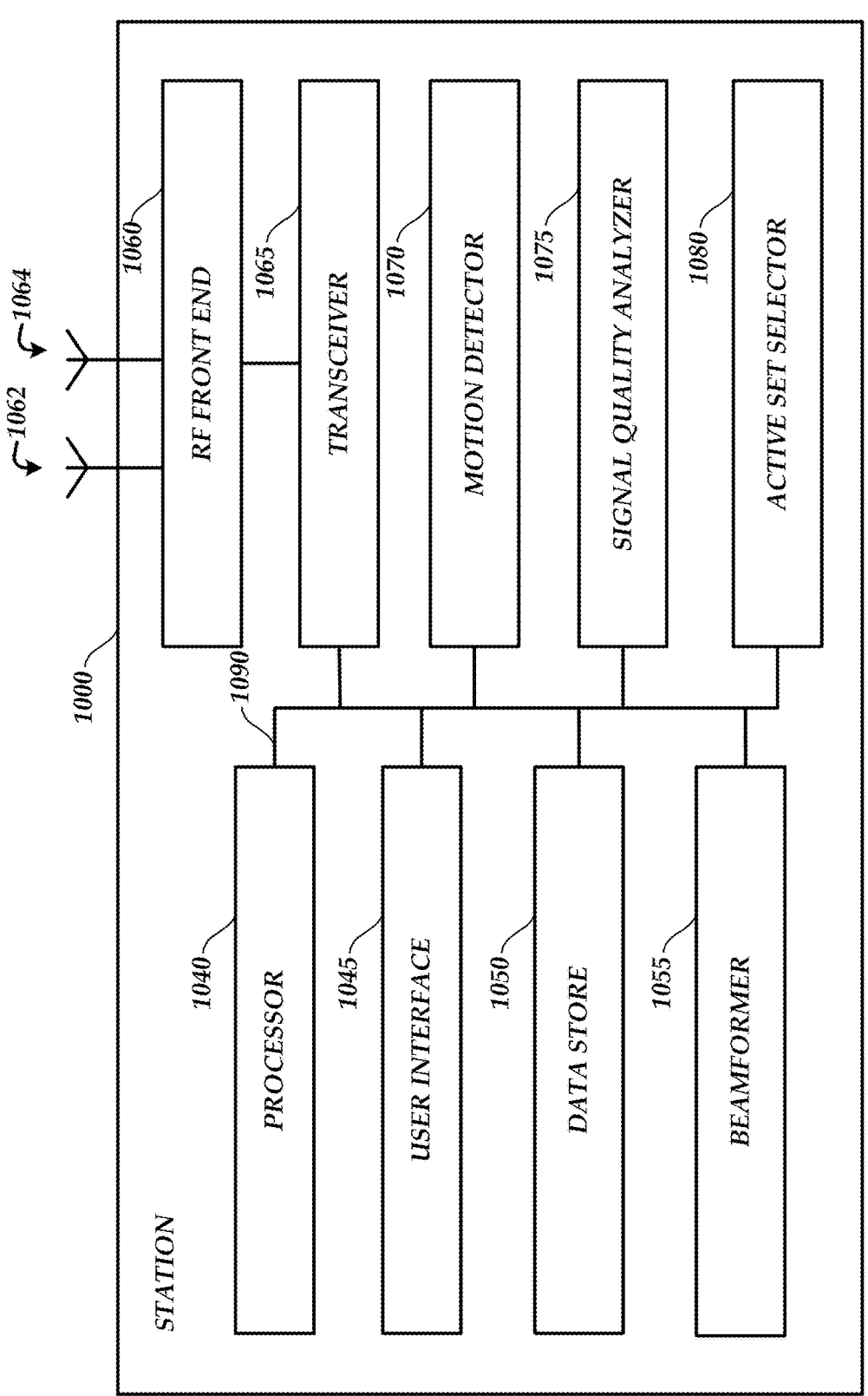
FIG. 10 is a schematic block diagram of an example STA according to an embodiment.

FIG. 10 is a schematic block diagram of an example STA 1000 according to an embodiment. The STA 1000 is configured for wirelessly communicating with a base station in a cooperative MIMO network. As illustrated in FIG. 10, the STA 1000 includes a processor 1040, a user interface 1045, a data store 1050, a beamformer 1055, antennas 1062 and 1064, a transceiver 1065, a motion detector 1070, a signal quality analyzer 1075, and an active set selector 1080. Some other STAs can include additional elements and/or a subset of the elements illustrated in FIG. 10.

The STA 1000 includes a plurality of antennas 1062 and 1064. Any suitable number of antennas can be included for wireless communication. The STA 1000 can include one or more arrays of antennas. A radio frequency (RF) front end 1060 can process RF signals received via the antennas 1062 and 1064. The RF front end can also provide RF signals to the antennas 1062 and 1064 for transmission. The transceiver 1065 includes a transmitter and a receiver. The transceiver 1065 can provide processing for transmitting and receiving RF signals associated with the antennas 1062 and 1064. For example, upon receiving active set data, the processor 1040 can configure the transceiver 1065 (e.g., receiver) to receive DL data associated with the spatial beam(s) identified in the active set data as being selected to serve the STA 1000.

The processor 1040 is in communication with the transceiver 1065. The processor 1040 is implemented by physical hardware arranged to perform specific operations to implement functionality related to determining a link strength of spatial beams over which beam pilots and/or user data are transmitted. The processor 1040 can determine the link strength, identify a spatial beam that provides the best link strength, and/or generate one or more messages to report the link strength to a serving node in accordance with any suitable principles and advantages disclosed herein. The processor 1040 can cause active set and neighbor set data to be stored and updated. The processor 1040 can perform any other suitable processing for the STA 1000.

The processor 1040 can be in communication with the motion detector 1070 and the signal quality analyzer 1075. Accordingly, the processor 1040 can receive and process information associated with conditions of the STA 1000. The motion detector 1070 can include any suitable hardware arranged to detect mobility information associated with the STA 1000. The signal quality analyzer 1075 can analyze the quality of signals received and/or transmitted by the antennas 1062 and 1064. This can provide information associated with a spatial channel condition of the STA 1000. The information associated with conditions of the STA 1000 can be provided to the processor 1040 for providing to the serving node(s). In some instances, some or all of the functionality of the motion detector 1070 and/or the signal quality analyzer can be implemented by the processor 1040.

The active set selector 1080 is optional and can identify a desired active set of one or more serving nodes. The active set selector 1080 can select the desired active set based on data associated with one or more of: one or more serving nodes in the active set, one or more serving nodes in the neighbor set, mobility data associated with the STA 1000, a spatial channel condition associated with the STA 1000, the link strength and/or the link quality of one or more spatial beams served by one or more serving nodes, or one or more characteristics of the STA 1000. The active set selector 1080 can optionally execute the active set management scheme to identify a desired active set. The active set selector 1080 can cause the processor 1040 to generate a message for transmission to a serving node and/or a BBU to request that a selected spatial beam (or selected spatial beams) be added to an active set for the STA 1000 (e.g., request that a selected spatial beam, which may be different than the spatial beam(s) already included in an active set for the STA 1000, be included in an updated active set for the STA 1000). The active set selector 1080 can be implemented by dedicated circuitry and/or circuitry of the processor 1040.

The beamformer 1055 can perform any suitable beamforming functionality for the STA 1000. The beamformer 1055 can set and/or adjust one or more parameters associated with receiving and/or transmitting signals associated with the antennas 1062 and 1064 of the STA 1000. The beamformer 1055 can be implemented by dedicated circuitry and/or circuitry of the processor 1040.

The STA 1040 includes a data store 1050. The data store 1050 can store instructions that can be executed by the processor 1040 to implement the features described herein. The data store 1050 can store active set data and neighbor set data for the STA 1000. The data store 1050 can store spatial beam link strengths and/or link qualities. The data store 1050 can store any other suitable data for the STA 1000. The data store 1050 can include any suitable memory elements arranged to store data.

Several elements included in the STA 1000 may be coupled by a bus 1090. The bus 1090 can be a data bus, communication bus, other bus, or any suitable combination thereof to enable the various components of the STA 1000 to exchange information.

As illustrated in FIG. 10, the STA 1000 also includes a user interface 1045. The user interface 1045 can be any suitable user interface, such as a display and/or an audio component. In some instances, the user interface 1045 can include one or more of touch screen capabilities, a button, a knob, a switch, or a slider.

Terminology, Applications, and Conclusion

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Additionally, the words "herein," "above," "below," and words of similar import, when used in this application, shall refer to this application as a whole and not to any particular portions of this application. Where the context permits, words in the above Detailed Description of Certain Embodiments using the singular or plural may also include the plural or singular, respectively. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

As used herein a "transmit-receive point" (TRP) (which can alternatively be referred to as a transmission reception point) may refer to a transceiver device or one transceiver element included in a device. When included as a transceiver element, the device may include multiple TRPs. The TRP may include one or more antennas which are coupled to signal processing circuitry. The signal processing circuitry may be included in the device. The TRP may include additional elements to facilitate transmission or receipt of wireless signals for one or more UEs. Example of such elements may include a power source, amplifier, digital-to-analog converter, analog-to-digital converter, or the like. When a TRP is allocated, such as by a BBU, to provide service to a UE, the TRP may be said to be a "serving node" for the UE.

As used herein a "remote radio unit" (RRU) may refer to a device for controlling and coordinating transmission and receipt of wireless signals for one or more UEs. An RRU may include or be coupled with one or more TRPs. The RRU may receive signals from the TRP and include the signal processing circuitry. The signal processing circuitry may be selectively operated to facilitate processing of signals associated with different TRPs.

While the above detailed description has shown, described, and pointed out novel features as applied to various embodiments, it can be understood that various omissions, substitutions, and changes in the form and details of the devices or algorithms illustrated can be made without departing from the spirit of the disclosure. For example, circuit blocks and/or method blocks described herein may be deleted, moved, added, subdivided, combined, arranged in a different order, and/or modified. Each of these blocks may be implemented in a variety of different ways. Any portion of any of the methods disclosed herein can be performed in association with specific instructions stored on a non-transitory computer readable storage medium being executed by one or more processors. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method of scheduling wireless communication based on time slices, the method comprising:
    obtaining interference data from one or more access points;
    obtaining traffic load data for one or more data packets to be transmitted by the one or more access points;
    determining a number of time slices within a downlink transmission period based on a number of the one or more access points;
    determining at least one of a length of the time slices or an assignment of the one or more access points to the time slices based on at least one of the interference data or the traffic load data; and
    transmitting, to each of the one or more access points, a scheduling message indicating a time slice within the time slices assigned to the respective access point, wherein the scheduling message transmitted to a first access point in the one or more access points causes the first access point to transmit a first data packet in the one or more data packets to an assigned station during the time slice indicated in the scheduling message.

2. The method of claim 1, wherein a first access point in the one or more access points is assigned to two or more of the time slices.

3. The method of claim 1, wherein the downlink transmission period comprises one of a contention-based access period or a schedule period, and wherein the schedule period is rasterized.

4. The method of claim 1, wherein the scheduling message transmitted to the first access point in the one or more access points further indicates a start time of the time slice assigned to the first access point and one of a duration or an end time of the time slice assigned to the first access point.

5. The method of claim 1, wherein the scheduling message transmitted to the first access point in the one or more access points further indicates the assigned station to which the first access point is configured to transmit during the time slice assigned to the first access point.

6. The method of claim 1, wherein the scheduling message transmitted to the first access point in the one or more access points further indicates at least one of a spatial beam or a modulation and coding size of the first access point that the first access point is configured to use to transmit to the assigned station during the time slice assigned to the first access point.

7. The method of claim 1, wherein the determination of the number of time slices within the downlink transmission period is one of a static determination or a dynamic determination.

8. The method of claim 1, further comprising determining a second number of second time slices within a second downlink transmission period that follows the downlink transmission period.

9. The method of claim 8, further comprising determining at least one of a second length of the second time slices or a second assignment of the one or more access points to the second time slices for the second downlink transmission period.

10. The method of claim 1, wherein each time slice in the time slices has a same length.

11. The method of claim 1, wherein one or more of the time slices in the time slices has a different length.

12. The method of claim 1, wherein a uniform number of access points in the one or more access points is assigned to each of the time slices.

13. The method of claim 1, wherein a non-uniform number of access points in the one or more access points is assigned to each of the time slices.

14. The method of claim 1, wherein a first time slice in the time slices is reserved for one or more outgoing access points in the one or more access points, and wherein a second time slice in the time slices is reserved for one or more incoming access points in the one or more access points.

15. The method of claim 1, wherein the first access point in the one or more access points is a serving access point for the assigned station, and wherein a second access point in the one or more access points is a backup serving access point for the assigned station.

16. The method of claim 15, wherein the first access point and the second access point are assigned to different time slices in the time slices.

17. Non-transitory, computer-readable storage comprising computer-executable instructions, wherein the computer-executable instructions, when executed by an access point controller, cause the access point controller to:

obtain interference data from one or more access points;

obtain traffic load data for one or more data packets to be transmitted by the one or more access points;

determine a number of time slices within a downlink transmission period based on a number of the one or more access points;

determine at least one of a length of the time slices or an assignment of the one or more access points to the time slices based on at least one of the interference data or the traffic load data; and transmit, to each of the one or more access points, a scheduling message indicating a time slice within the time slices assigned to the respective access point, wherein the scheduling message transmitted to a first access point in the one or more access points causes the first access point to transmit a first data packet in the one or more data packets to an assigned station during the time slice indicated in the scheduling message.

18. The non-transitory, computer-readable storage of claim 17, wherein the scheduling message transmitted to the first access point further indicates a start time of the time slice assigned to the first access point and one of a duration or an end time of the time slice assigned to the first access point.

19. A network system for wireless communication, the network system comprising:

an access point; and an access point controller comprising at least one processor and storing instructions, wherein the instructions, when executed by the at least one processor, cause the access point to perform operations, the operations comprising:

obtaining interference data from the access point and one or more other access points;

obtaining traffic load data for one or more data packets to be transmitted by the access point and the one or more other access points;

determining a number of time slices within a downlink transmission period based on a number of the access point and the one or more other access points;

determining at least one of a length of the time slices or an assignment of the access point and one or more other access points to the time slices based on at least one of the interference data or the traffic load data; and transmitting, to each of the access point and the one or more other access points, a scheduling message indicating a time slice within the time slices assigned to the respective access point, wherein the scheduling message transmitted to a first access point in the one or more access points causes the first access point to transmit a first data packet in the one or more data packets to an assigned station during the time slice indicated in the scheduling message.

20. The network system of claim 19, wherein the scheduling message transmitted to the first access point further indicates a start time of the time slice assigned to the first access point and one of a duration or an end time of the time slice assigned to the first access point.

* * * * *